(12) United States Patent
Agrawal et al.

(10) Patent No.: US 6,324,533 B1
(45) Date of Patent: Nov. 27, 2001

(54) INTEGRATED DATABASE AND DATA-MINING SYSTEM

(75) Inventors: Rakesh Agrawal; Sunita Sarawagi, both of San Jose, CA (US); Shiby Thomas, Gainesville, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/087,561

(22) Filed: May 29, 1998

(51) Int. Cl.$^7$ ................................ G06F 17/30; G06F 7/00

(52) U.S. Cl. ................................................ 707/3; 706/47

(58) Field of Search ................................ 707/1, 3, 4, 6; 705/10; 706/47, 46

(56) References Cited

U.S. PATENT DOCUMENTS

| | | | |
|---|---|---|---|
| 5,615,341 | 3/1997 | Agrawal et al. | 395/210 |
| 5,664,171 | 9/1997 | Agrawal et al. | 395/602 |
| 5,664,174 | 9/1997 | Agrawal et al. | 395/606 |
| 5,724,573 | 3/1998 | Agrawal et al. | 395/606 |
| 5,832,482 * | 11/1998 | Yu et al. | 707/6 |
| 5,970,464 * | 10/1999 | Apte et al. | 705/4 |
| 6,094,645 * | 7/2000 | Aggarwal et al. | 706/47 |

OTHER PUBLICATIONS

Tang et al., "Using Incremental Pruning to Increase the Efficiency of Dynamic Itemset Counting for Mining Asssociation Rules", ACM 1998.*

Srikant et al, "Mining Quantitative Association Rules in Large Relational Tables", ACM 1996.*

Sarawagi et al, "Integrating Association Rule Mining with Relational Database Systems: Alternatives and Implications", ACM 1998, pp. 343–354.*

R. Agrawal et al., "Data Mining: A Performance Perspective," IEEE Transactions on Knowledge and Data Engineering, vol. 5, No. 6, Dec. 1993, pp. 914–925.

R. Agrawal et al., "Developing Tightly–Coupled Data Mining Applications on a Relational Database System," Proceedings of the 2nd Int'l Conference on Knowledge Discovery in Databases and Data Mining, Oregon, Aug. 1996.

R. Agrawal et al., "Fast Algorithms for Mining Association Rules," Proceedings of the 20th VLDB Conference, Santiago, Chile, 1994, pp. 487–499.

R. Agrawal et al., "Mining Association Rules between Sets of Items in Large Databases," Proceedings of the ACM–SIGMOD 1993 Int'l Conference on the Management of Data, Washington, DC, 1993, pp. 207–216.

R. Agrawal et al., "Mining Sequential Patterns," Proceedings of the Int'l Conference on Data Engineering, Taipei, Taiwan, 1995, pp. 3–14.

Bayardo, Jr., "Brute–Force Mining of High–Conference Classification Rules," Proceedings of the 3rd Int'l Conference on Knowlege Discovery and Data Mining, California, 1997.

(List continued on next page.)

Primary Examiner—Thomas G. Black
Assistant Examiner—Uyen Le
(74) Attorney, Agent, or Firm—Khanh Q. Tran

(57) ABSTRACT

A method and apparatus for mining data relationships from an integrated database and data-mining system are disclosed. A set of frequent 1-itemsets is generated using a group-by query on data transactions. From these frequent 1-itemsets and the transactions, frequent 2-itemsets are determined. A candidate set of (n+2)-itemsets are generated from the frequent 2-itemsets, where n=1. Frequent (n+2)-itemsets are determined from candidate set and the transaction table using a query operation. The candidate set and frequent (n+2)-itemset are generated for (n+1) until the candidate set is empty. Rules are then extracted from the union of the determined frequent itemsets.

33 Claims, 16 Drawing Sheets

OTHER PUBLICATIONS

S. Brin et al., "Dynamic Itemset Counting and Implication Rules for Market Basket Data," Proceedings of the ACM SIGMOD Conference on Management of Data, 1997.

J. Han, "Discovery of Muliple–Level Association Rules from Large Databases," Proceedings of the 21st VLBD Conference, Zurich, Switzerland, 1995, pp. 420–431.

M. Houtsma, "Set–Oriented Mining for Assocation Rules in Relational Databases," Proc. of the Int'l Conference on Data Engineering, Taipei, Taiwan, 1995, pp. 25–33.

T. Imielinski et al., "A Database Perspective on Knowledge Discovery," Communication of the ACM, vol. 39, No. 11, Nov. 1996, pp. 58–64.

D. Lin et al., "Pincer–Search: A New Algorithm for Discovering the Maximum Frequent Set," EDBT '98, Jun., 1998.

H. Mannila et al., "Improved Methods for Finding Association Rules," Pub. No. C–1993–65, University of Helsinki, 1993, pp. 1–20.

R. Meo et al., "A New SQL–like Operator for Mining Association Rules," Proceedings of the 22nd VLDB Conference Mumbai (Bombay), India, 1996.

J.S. Park et al., "An Effective Hash–Based Algorithm for Mining Association Rules," Proceedings of the 1995 ACM SIGMOD Conference, San Jose, California, 1995, pp. 175–186.

J.S. Park et al., "Efficient Parallel Data Mining for Association Rules," IBM Research Report, RJ20156, Aug., 1995, 26 pages.

S. Sarawagi et al., "Integrating Association Rule Mining with Relational Database Systems: Alternatives and Implications," IBM Research Report, RJ10107, Mar., 1998, 31 pages.

A. Savasere et al., "An Efficient Algorithm for Mining Association Rules in Large Databases," Proceedings of the 21st VLDB Conference, Zurich, Switzerland, 1995, pp. 432–444.

A. Siebes et al., "KESO: Minimizing Database Interaction," Proceedings of the 3rd Int'l Conference on Knowledge Discovery and Data Mining, California, 1997, pp. 247–250.

R. Srikant et al., "Mining Association Rules with Item Constraints," Proceedings of the 3rd Int'l Conference on Knowledge Discovery in Databases and Data Mining, Oregon, 1996, pp. 67–73.

R. Srikant et al., "Mining Sequential Patterns: Generalizations and Performance Improvements," IBM Research Report, RJ9994, Dec. 1995. Also in Proceedings of the 5th Conference on Extending Database Technology (EDBT) Avignon, France, 1996.

M.J. Zaki et al., "New Algorithms for Fast Discovery of Association Rules," Proceedings of the 3rd Int'l Conference on Knowledge Discovery and Data Mining, California, Aug. 1997, pp. 283–286.

"Advances in Knowledge Discovery and Data Mining," edited by U. M. Fayyad et al., AAAI Press / The MIT Press, Copyright 1996.

* cited by examiner

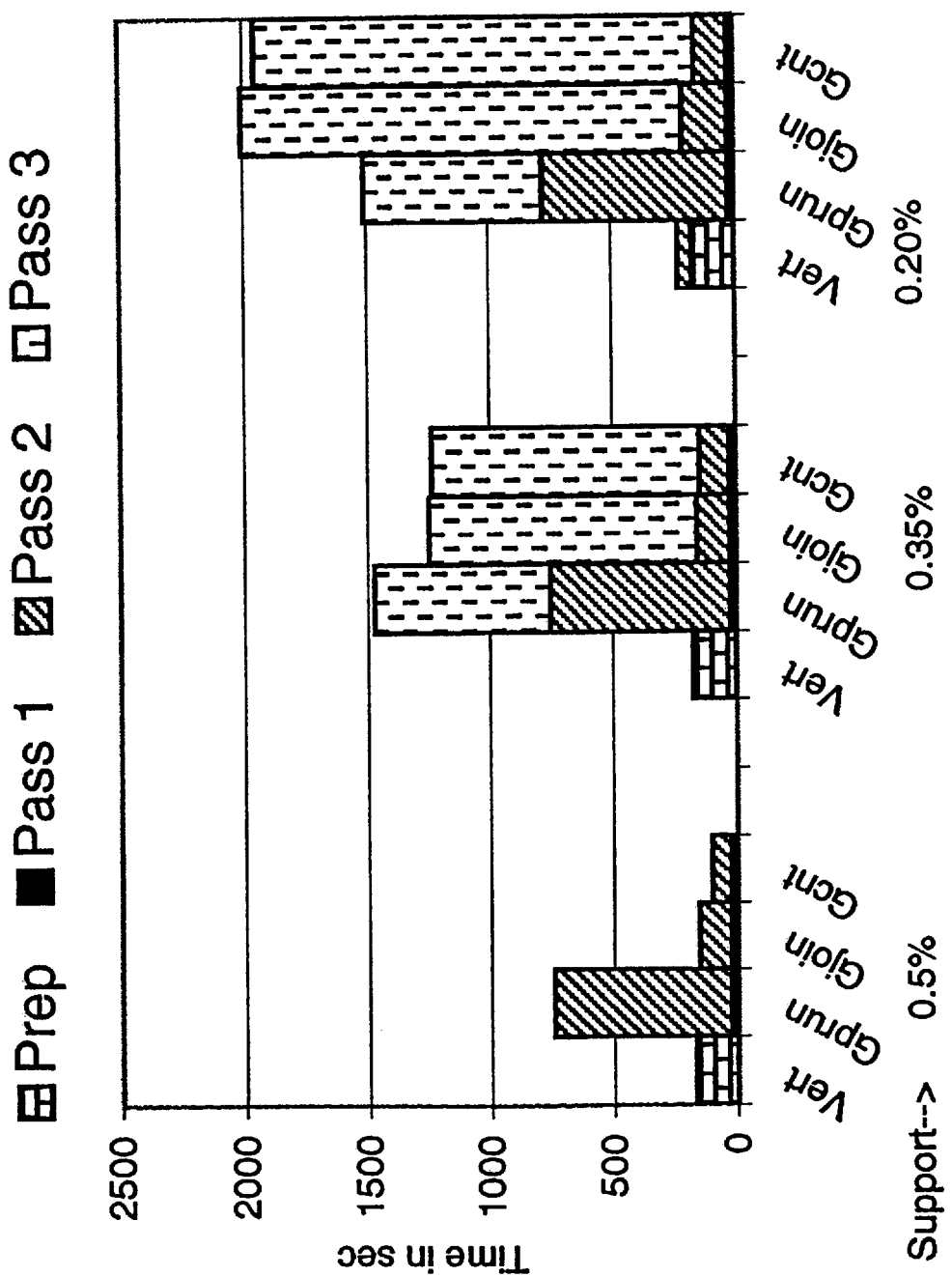
FIG 13A (Data set A)

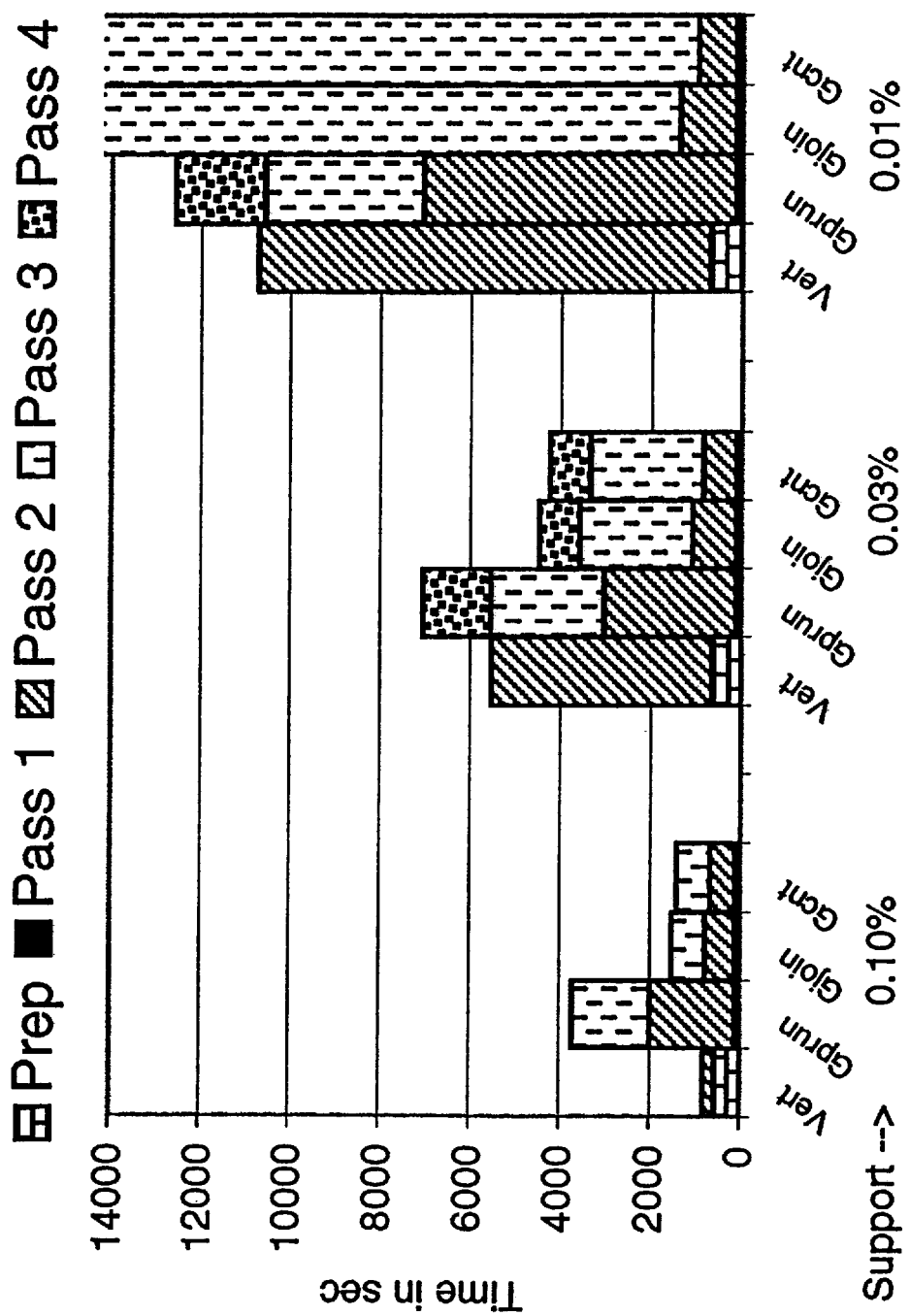
FIG 13B (Data set B)

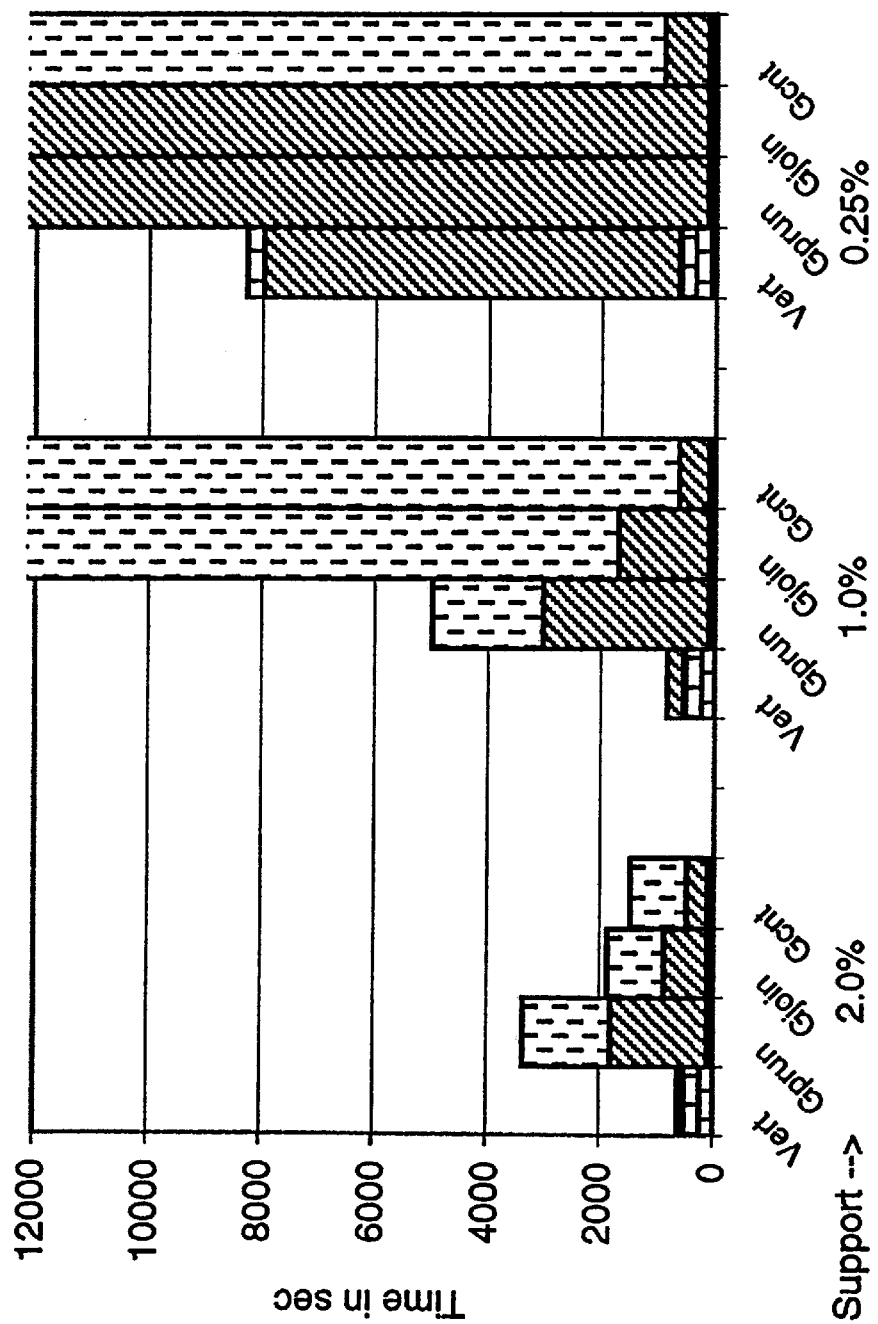
FIG 13C (Data set C)

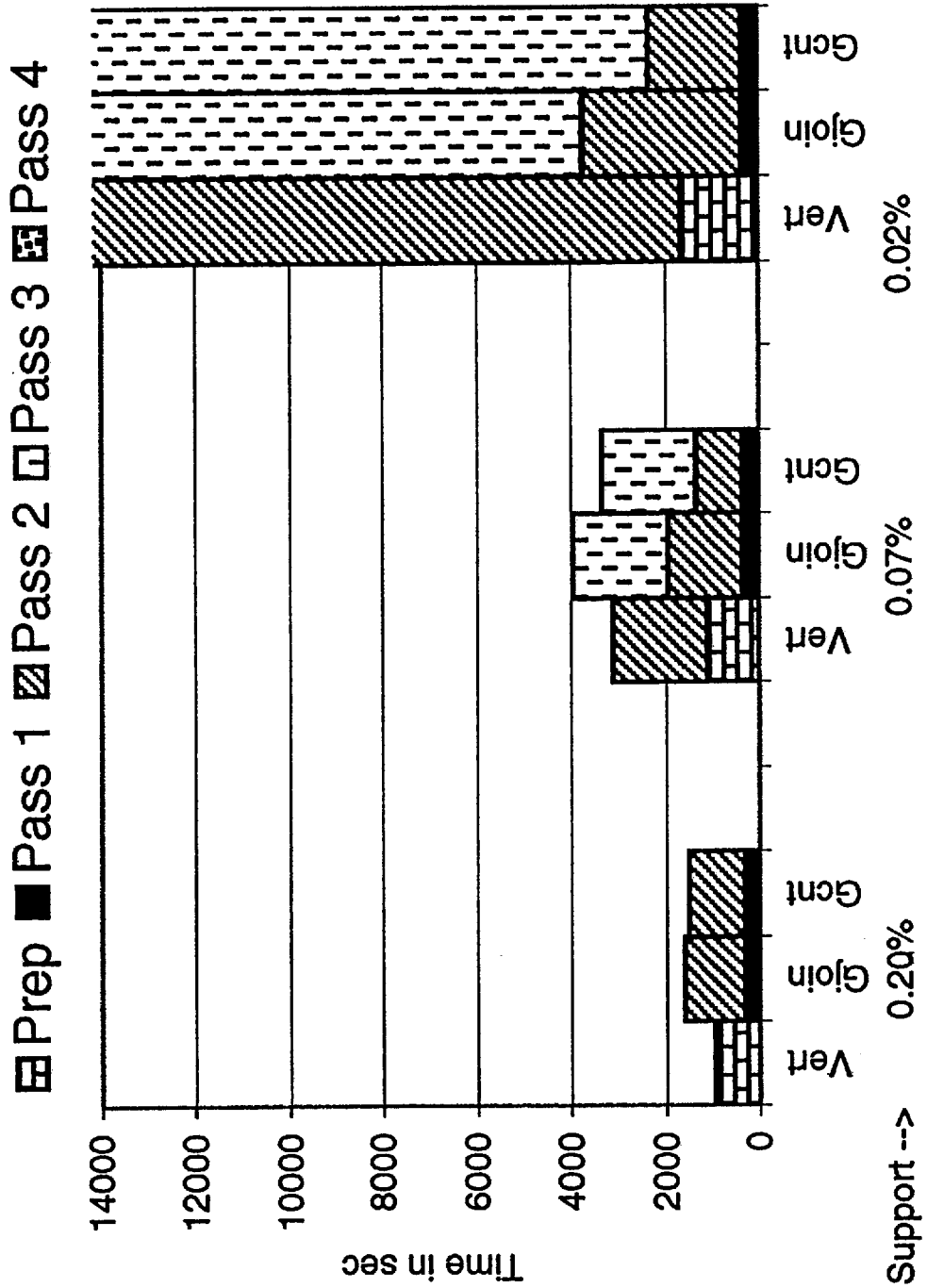
FIG 13D (Data set D)

INTEGRATED DATABASE AND DATA-MINING SYSTEM

FIELD OF THE INVENTION

The present invention generally relates to data processing, and more particularly, to a method and system for efficiently mining data relationships from an integrated database and data-mining system.

BACKGROUND OF THE INVENTION

A recent trend in database applications is the installation of larger and larger data warehouses built around relational database technology in an increasing number of enterprises. There is a great demand for being able to mine nuggets of knowledge from these data warehouses. The initial research on data mining was concentrated on defining new mining operations and developing algorithms for them. Most early mining systems were developed largely on file systems in which specialized data structures and buffer management strategies were devised for each mining algorithm. Coupling data mining with database systems was at best loose, and access to data in a database management system (DBMS) was provided through an Open Database Connectivity (ODBC) interface or a Structured Query Language (SQL) cursor interface. Such an interface is described, for example, in the IBM Intelligent Miner User's Guide, Version 1 Release 1, published by International Business Machines Corp., July 1996. Other interfaces are described by R. Agrawal et al. in the paper "The Quest Data Mining System," Proc. of the 2nd Int'l Conference on Knowledge Discovery in Databases and Data Mining, Portland, Oreg., August 1996, and by J. Han et al. in "DMQL: A Data Mining Query Language For Relational Databases," Proc. of the 1996 SIGMOD Workshop on Research Issues on Data mining and Knowledge Discovery, Montreal, Canada, May 1996.

Recently, researchers have started to focus on issues related to integrating mining with databases, such as proposals to extend the SQL language to support mining operators. For instance, the query language DMQL proposed by Han et al. extends SQL with a collection of operators for mining characteristic rules, discriminant rules, classification rules, association rules, etc. In the paper "Discovery Board Application Programming Interface and Query Language for Database Mining," Proc. of the 2nd Int'l Conference on Knowledge Discovery and Data Mining, Oregon, August 1996, Imielinski et al. extend M-SQL, which is an extension of the SQL language with a special unified operator to generate and query a whole set of propositional rules. Another example is the mine rule operator proposed by Meo et al. for a generalized version of the association rule discovery problem, described in "A New SQL Like Operator For Mining Association Rules," Proc. of the 22nd Int'l Conference on Very Large Databases, India, September 1996. Tsur et al. also proposed "query flocks" for data mining using a generate-and-test model, as described in "Query Flocks: A Generalization of Association Rule Mining," available on the World Wide Web at http://db.stanford.edu/ullman/pub/flocks.ps, October 1997.

The issue of tightly coupling a mining algorithm with a relational database system from the systems point of view was addressed by R. Agrawal et al. in a paper entitled "Developing Tightly-coupled Data Mining Applications On A Relational Database System," Proc. of the 2nd Int'l Conference on Knowledge Discovery in Databases and Data Mining, Oregon, August 1996. This proposal makes use of user-defined functions (UDFs) in SQL statements to selectively push parts of the application that perform computations on data records into the database system. The objective here was to avoid one-at-a-time record retrieval from the database to the application address space, saving both the copying and process context switching costs. In the paper entitled "KESO: Minimizing Database Interaction," Proc. of the 3rd Int'l Conference on Knowledge Discovery and Data Mining, August 1997, A. Siebes et al. focus on developing a mining system with minimal database interaction. Another algorithm for finding association rules, SETM, was expressed in the form of SQL queries and described by M. Houtsma et al. in "Set-oriented Mining of Association Rules," Proc. of the Int'l Conference on Data Engineering, Taiwan, 1995. However, SETM is not efficient and there are no results reported on running it against a relational DBMS.

Therefore, there is still a need of a method for efficiently mining data from an integrated database and data-mining system that has a shorter response time, requires less memory to operate, does not suffer the disadvantages discussed in the Background section.

SUMMARY OF THE INVENTION

It is an object of the present invention to provide an efficient method for extracting data relationships from an integrated database and data-mining system.

Another object of the present invention is to provide a method for mining data relationships from the integrated mining system in the form of queries to SQL engines, and with k-way join, three-way join, subqueries, and group-by operations for counting the itemset support.

Still another object of the present invention is to provide a method for mining data relationships from the integrated mining system in the form of queries to SQL engines enhanced with object-relational extensions (SQL-OR), such as user-defined functions (UDFs) and table functions.

The present invention achieves the foregoing and other objects by providing a method for identifying rules from an integrated database and data-mining system, where the system includes a database in the form of a table of transactions and a query engine. The method includes the steps of: a) performing a group-by query on the transaction table to generate a set of frequent 1-itemsets; b) determining frequent 2-itemsets from the frequent 1-itemsets and the transaction table; c) generating a candidate set of (n+2)-itemsets from the frequent (n+1)-itemsets, where n=1; d) determining frequent (n+2)-itemsets from the candidate set of (n+2)-itemsets and the transaction table using a query; e) repeating steps (c) and (d) with n=n+1 until the candidate set is empty; and f) generating rules from the union of the determined frequent itemsets.

The group-by query preferably includes the steps of counting the number of transactions that contain each item and selecting the items that have a support above a user-specified threshold in determining the frequent 1-itemsets. The support of an item is the number of transactions that contain the item. In determining the frequent 2-itemsets, each 1-itemset is joined with itself and two copies of the transaction table using join predicates. The joining results for a pair of items are grouped together in counting the support of the items in the pair. All 2-itemsets that have a support below a specified threshold are removed from the set of 2-itemsets, resulting in the frequent 2-itemsets.

Preferably, the candidate (n+2)-itemsets are generated using an (n+2)-way join operation. Also, the frequent (n+2)-itemsets are determined using an (n+3)-way join query on the candidate itemsets and (n+2) copies of the transaction table. Alternatively, the frequent (n+2)-itemsets are determined using cascaded subqueries by: a) selecting distinct first items in the candidate itemsets using a subquery; b) joining the distinct first items with the transaction table; c) cascading (n+1) subqueries where each j-th subquery is a three-way join of the result of the last subquery, distinct j items from the candidate itemsets, and the transaction table; and d) using the results of the last subqueries to determine which of the (n+2)-itemsets are frequent.

In generating rules from the union of the frequent itemsets, all items from the frequent itemsets are first put into a table F. A set of candidate rules is created from the table F using a table function. These candidate rules are joined with the table F, and filtered to remove those that do not meet a confidence criteria.

In the case where the mining engine is an object-relational engine, the generation of 2-itemsets and (n+1)-itemsets preferably includes: a) selecting from Vertical, GatherCount, and GatherJoin a method that has the best cost for generating the (n+1)-itemsets; b) if the Vertical method is selected, then transforming the transaction table into a vertical format if it is not already transformed; and c) generating the frequent (n+1)-itemsets using the selected method.

Additional objects and advantages of the present invention will be set forth in the description which follows, and in part will be obvious from the description or may be learned from the practice of this invention. The objects of the invention as described herein may be realized and obtained by means particularly pointed out and distinctly claimed in the appended claims taken in conjunction with the accompanying drawings and detailed specification.

BRIEF DESCRIPTION OF THE DRAWINGS

FIGS. 13A–13D are graphs comparing the performance of the four SQL-OR approaches: GatherJoin method and its variants GatherPrune, GatherCount, and Vertical, on four datasets for different support values.

DESCRIPTION OF THE PREFERRED EMBODIMENTS

The invention will be described primarily in terms of methods for mining relationships among data items from an integrated system of a database and a data-mining engine. However, persons skilled in the art will recognize that a computing system, which includes suitable programming means for operating in accordance with the methods to be disclosed, also falls within the spirit and scope of the invention. In addition, the invention may also be embodied in a computer program product, such as a diskette, for use with a suitable data processing system. Programming means is also provided for directing the data processing system to execute the steps of the methods of the invention, as embodied in the program product.

Figure 1:
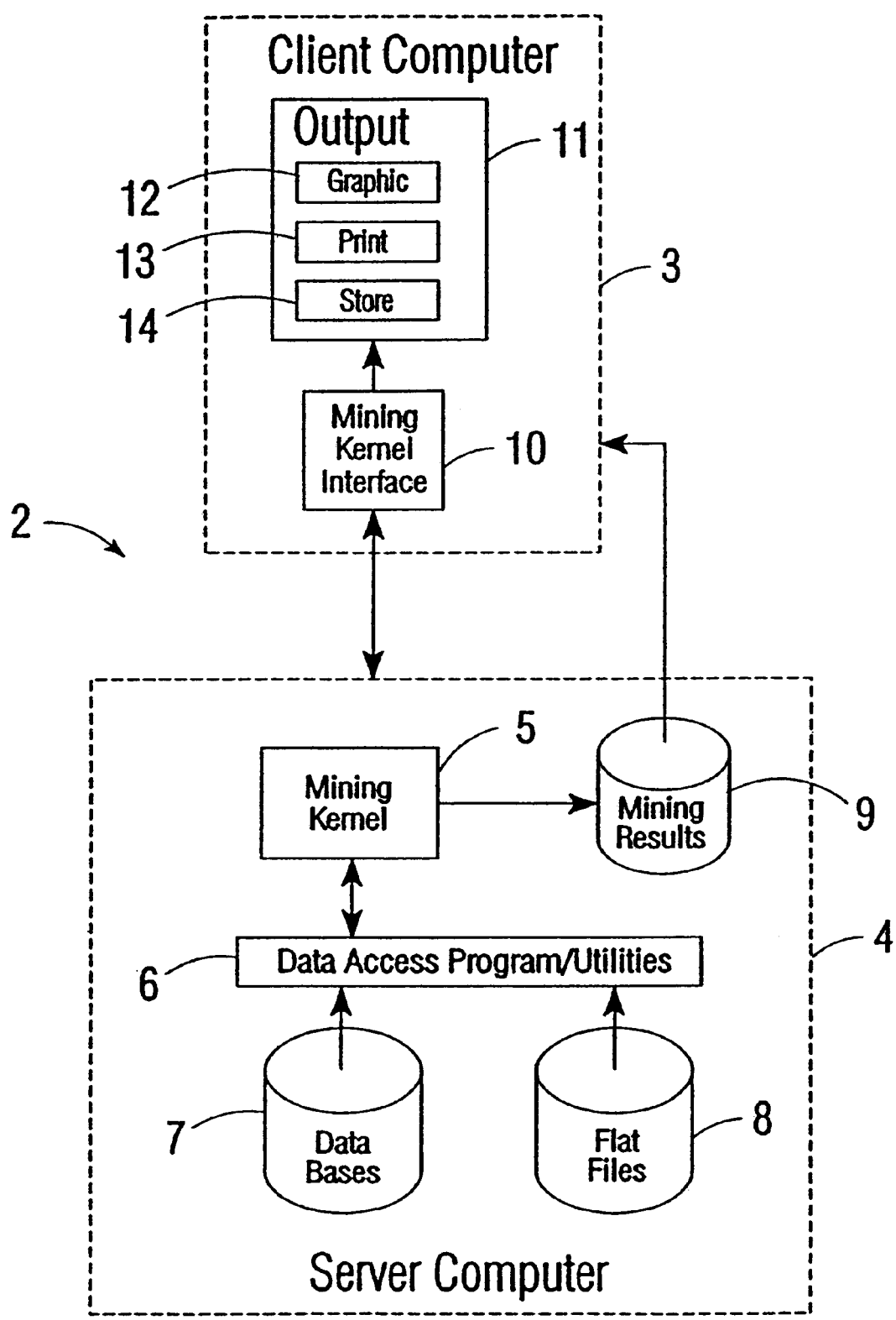
FIG. 1 is a block diagram of the system in which the methods of mining data, in accordance with the invention, may be practiced.

FIG. 1 is a simplified block diagram of a typical computing system 2 in which the methods of the invention may be practiced. In FIG. 1, the system 2 includes one or more data processing apparatus, such as a client computer 3 and a server computer 4. In one intended embodiment, the server computer 4 may be a mainframe computer made by IBM Corp., and use an operating system such as one marketed by IBM Corp. under the name MVS. Alternatively, the server computer 4 may be an IBM RS/6000 workstation running version 3.2.5 of the IBM AIX operating system. The server computer 4 may have a database system such as IBM DB2, or it may have data stored as data files, i.e., flat files, in a data storage medium such as a diskette, disk, or tape. It is to be understood that architectures other than the one shown may be used. For example, the functions of the client computer 3 may be incorporated into the server computer 4, and vice versa.

As shown, the operating system of the server computer 4 includes a mining kernel 5 which may be executed by a processor within the server computer 4 as a series of computer-executable instructions. These instructions may reside, for example, in the RAM of the server computer 4. Alternatively, the instructions may be contained on a data storage device with a computer readable medium, such as a computer diskette, a DASD array, magnetic tape, optical storage device, or other suitable data storage devices. As an illustrative embodiment, the instructions may be implemented in the C++ computer programming language.

FIG. 1 shows that, through appropriate data access programs and utilities 6, the mining kernel 5 accesses one or more databases 7 or flat files 8 which contain data transactions. After performing the mining operations in accordance with the invention as described below, the mining kernel 5 outputs patterns it discovers to a mining results depository 9, which can be accessed by the client computer 3.

Additionally, FIG. 1 shows that the client computer 3 can include a mining kernel interface 10 which, like the mining kernel 5, may be implemented in suitable computer code. Among other things, the interface 10 functions as an input mechanism for establishing certain variables, including the values of the minimum support and time-gap constraints as defined below. Further, the client computer 3 preferably includes an output device 11 for outputting or displaying the mining results. As shown, the output device 11 may include a display monitor 12, a printing device 13, or a data storage medium 14.

Background

Some basic concepts of data mining are now described to facilitate the description of the invention which follows.

1. Association Rules

Given a set of transactions, where each transaction is a set of items, an association rule is an expression X→Y, where X and Y are sets of items. See, for example, "Mining Association Rules Between Sets Of Items In Large Databases," R. Agrawal et al., Proc. of the ACM SIGMOD Conference on Management of Data, pp. 207–216, Washington, D.C., May 1993. The intuitive meaning of such a rule is that transactions in the database which contain the items in X tend to also contain the items in Y. An example of such a rule might be that "30% of transactions that contain beer also contain diapers; 2% of all transactions contain both these items". Here 30% is called the CONFIDENCE of the rule, and 2% the SUPPORT of the rule. The problem of mining association rules is to find all rules that satisfy a user-specified minimum support and minimum confidence. This problem can be decomposed into two subproblems:

Find all combinations of items whose support is greater than minimum support. Call those combinations frequent itemsets; and Use the frequent itemsets to generate the desired rules. The idea is that if, say, ABCD and AB are frequent itemsets, then it can be determined whether the rule AB→CD holds by computing the ratio r=support (ABCD)/support(AB). The rule holds only if r>minimum confidence. Note that the rule will have minimum support because ABCD is frequent.

2. Apriori Method

The basic Apriori method for finding frequent itemsets makes multiple passes over the data. In the k-th pass it finds all itemsets having k items called the k-itemsets. Each pass consists of two phases. Let $F_k$ represent the set of frequent k-itemsets, and $C_k$ the set of candidate k-itemsets (potentially frequent itemsets). First, in the candidate generation phase, the set of all frequent (k-1)-itemsets, $F_{k-1}$, found in the (k-1)-th pass, is used to generate the candidate itemsets $C_k$. The candidate generation procedure ensures that $C_k$ is a superset of the set of all frequent k-itemsets. The algorithm builds a specialized hash-tree data structure in memory out of $C_k$. Data is then scanned in the support counting phase. For each transaction, the algorithm determines which of the candidates in $C_k$ are contained in the transaction using the hash-tree data structure and increments their support count. At the end of the pass, $C_k$ is examined to determine which of the candidates are frequent, yielding $F_k$. The algorithm terminates when $F_k$ or $C_{k+1}$ becomes empty.

3. Input-output formats

Input format: The transaction table T normally has two column attributes: transaction identifier (tid) and item identifier (item). The number of items per transaction is variable and unknown during table creation time. Thus, alternative schemes may not be convenient. In particular, it is not practical to assume that all items in a transaction appear as different columns of a single tuple because often the number of items per transaction can be more than the maximum number of columns that the database supports. For instance, for one of our real-life datasets the maximum number of items per transaction is 872 and for another it is 700. In contrast, the corresponding average number of items per transaction is only 9.6 and 4.4 respectively.

Output format: The output is a collection of rules of varying length. The maximum length of these rules is much smaller than the number of items and is rarely more than a dozen. Therefore, a rule is represented as a tuple in a fixed-width table where the extra column values are set to NULL to accommodate rules involving smaller itemsets. The schema of a rule is (item$_1$, . . . , item$_k$, len, rulem, confidence, support) where k is the size of the largest frequent itemset. The len attribute gives the length of the rule and the rulem attribute gives the position of the→in the rule.

Mining in an Integrated Database and Data-mining System

Several configurations for coupling data mining with relational database systems and several methods for identifying rules from such configurations are now described. Persons skilled in the art of computer science will find that these methods may be adapted for mining association rules with hierarchies as well as sequential patterns. Those implemented in SQL offer the advantage of leveraging on existing schemes to make the systems robust, portable, scalable, and highly concurrent, such as indexing and query processing capabilities. Rather than devising specialized parallelizations, one can potentially exploit the underlying SQL parallelization, particularly in a shared-memory multiprocessor (SMP) environment. The DBMS support for checkpointing and space management can be valuable for long-running mining algorithms on huge amounts of data. The development of new algorithms could be faster if expressed declaratively using a few SQL operations.

Figure 2:
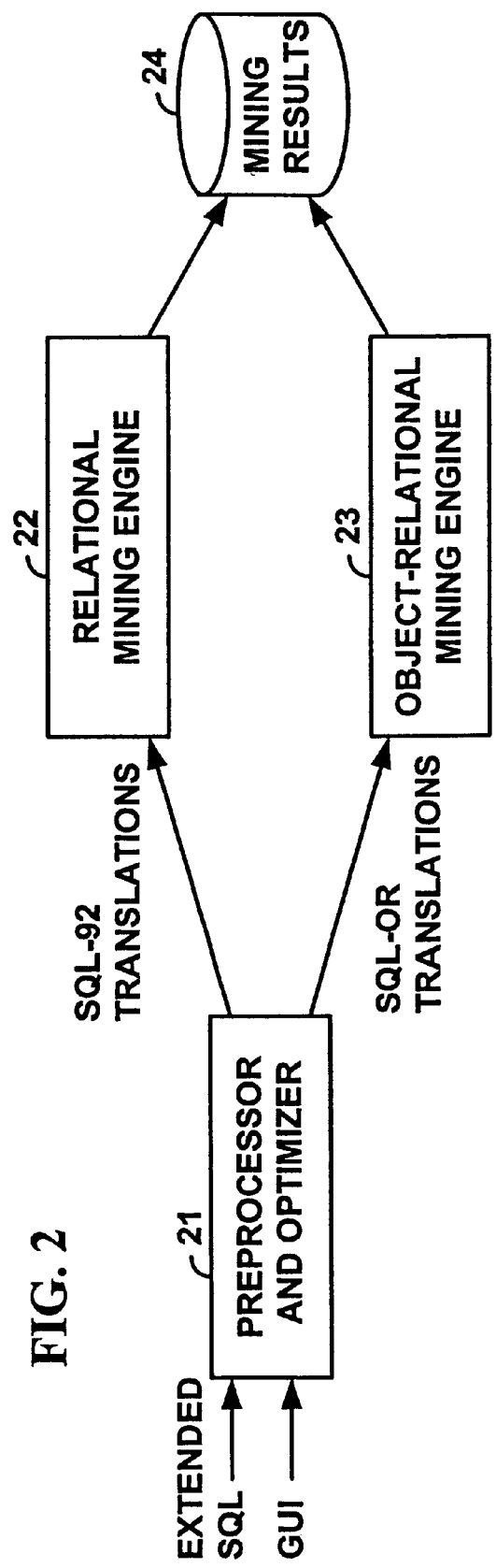
FIG. 2 is a simplified block diagram of an integrated database and data-mining system in accordance with the invention.

FIG. 2 schematically shows the configuration of an integrated database and data-mining system. The mining operation is expressed in some extension of SQL or a graphical language, which are input to preprocessor 21. This preprocessor generates appropriate SQL translations for the mining operation. For example, these SQL translations may be those that are executed by a SQL-92 relational engine 22, or by an object-relational engine 23 having the newer object-relational capabilities for an SQL (SQL-OR). The SQL-92 engine is described by J. Melton et al. in the book entitled "Understanding The New SQL: A Complete Guide," Morgan and Kauffman, 1992. Object-relational extensions are described by K. Kulkarni et al. in "Object Oriented Extensions in SQL3: A Status Report," SIGMOD Record, 1994. It is assumed that blobs, user-defined functions, and table functions are available in the object-relational engine. The mining results might be output to a depository 24.

Figure 3:
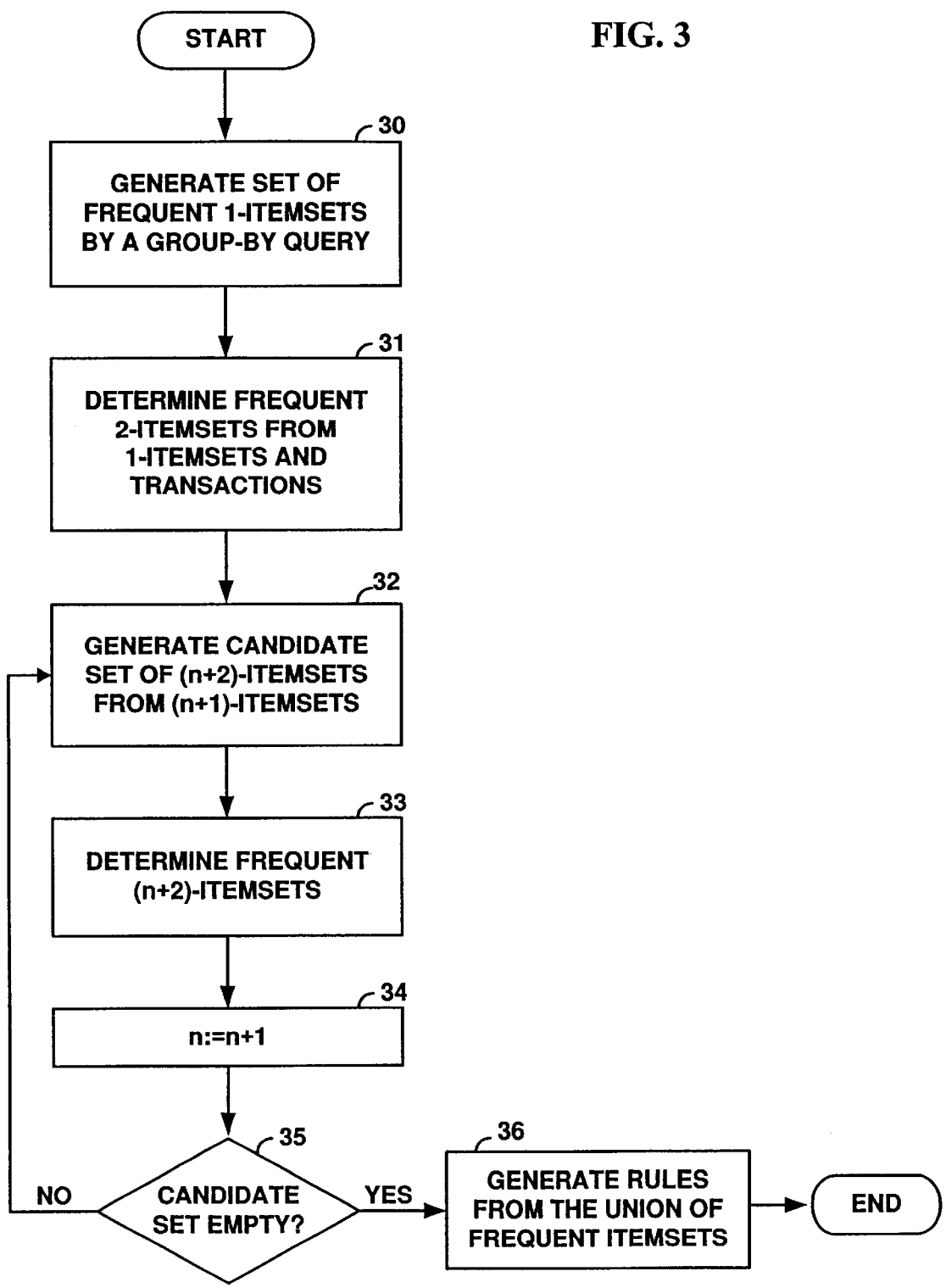
FIG. 3 is a flowchart representing the general operation of a basic method for mining data relationships in an integrated database and data-mining system, in accordance with the invention.

FIG. 3 is a flow chart showing the general operation of a method for mining data in an integrated database and data-mining system. Start with step 30, a group-by query is performed on the data transactions to generate a set of frequent 1-itemsets. One-itemsets are those having exactly one item each, while an itemset is frequent if the number of transactions containing it is at least at a specified number. At step 31, frequent 2-itemsets are determined from the frequent 1-itemsets and the transaction table. A candidate set of (n+2)-itemsets is next generated in step 32 from the frequent (n+1)-itemsets, where n=1. At step 33, frequent (n+2)-itemsets are generated from the candidate set of (n+2)-itemsets and the transaction table using a query. Steps 32 and 33 are repeated for the next value of n until the candidate set is empty, as shown by step 35. When the candidate set is empty, rules are generated from the union of the determined frequent itemsets in step 36. Further details of the steps in FIG. 3 are now described.

1. Candidate generation

The basic process for finding frequent itemsets proceeds as follows. In each pass k of the algorithm, a candidate itemset set $C_k$ is generated from frequent itemsets $F_{k-1}$ of the previous pass. Given the set of all frequent (k-1)-itemsets, $F_{k-1}$, the candidate generation procedure returns a superset of the set of all frequent k-itemsets. The items in an itemset are assumed to be lexicographically ordered. Since all subsets of a frequent itemset are also frequent, the candidate itemset set $C_k$ can be generated from $F_{k-1}$ as follows:

First, in the join step, a superset of the candidate itemsets $C_k$ is generated by joining $F_{k-1}$ with itself, as shown in the following pseudo code:

insert into $C_k$ select $I_1.item_1, \ldots, I_1.item_{k-1}, I_2.item_{k-1}$
      from $F_{k-1}\ I_1, F_{k-1}\ I_2$
      where $I_1.item_1=I_2.item_1$ and
        $I_1.item_{k-2}=I_2.item_{k-2}$ and
        $I_1.item_{k-1}<I_2.item_{k-1}$ For example, let $F_3$ be $\{\{1\ 2\ 3\}, \{1\ 2\ 4\}, \{1\ 3\ 4\}, \{1\ 3\ 5\}, \{2\ 3\ 4\}\}$. After the join step, $C_4$ will be $\{\{1\ 2\ 3\ 4\}, \{1\ 3\ 4\ 5\}\}$.

Figure 4:
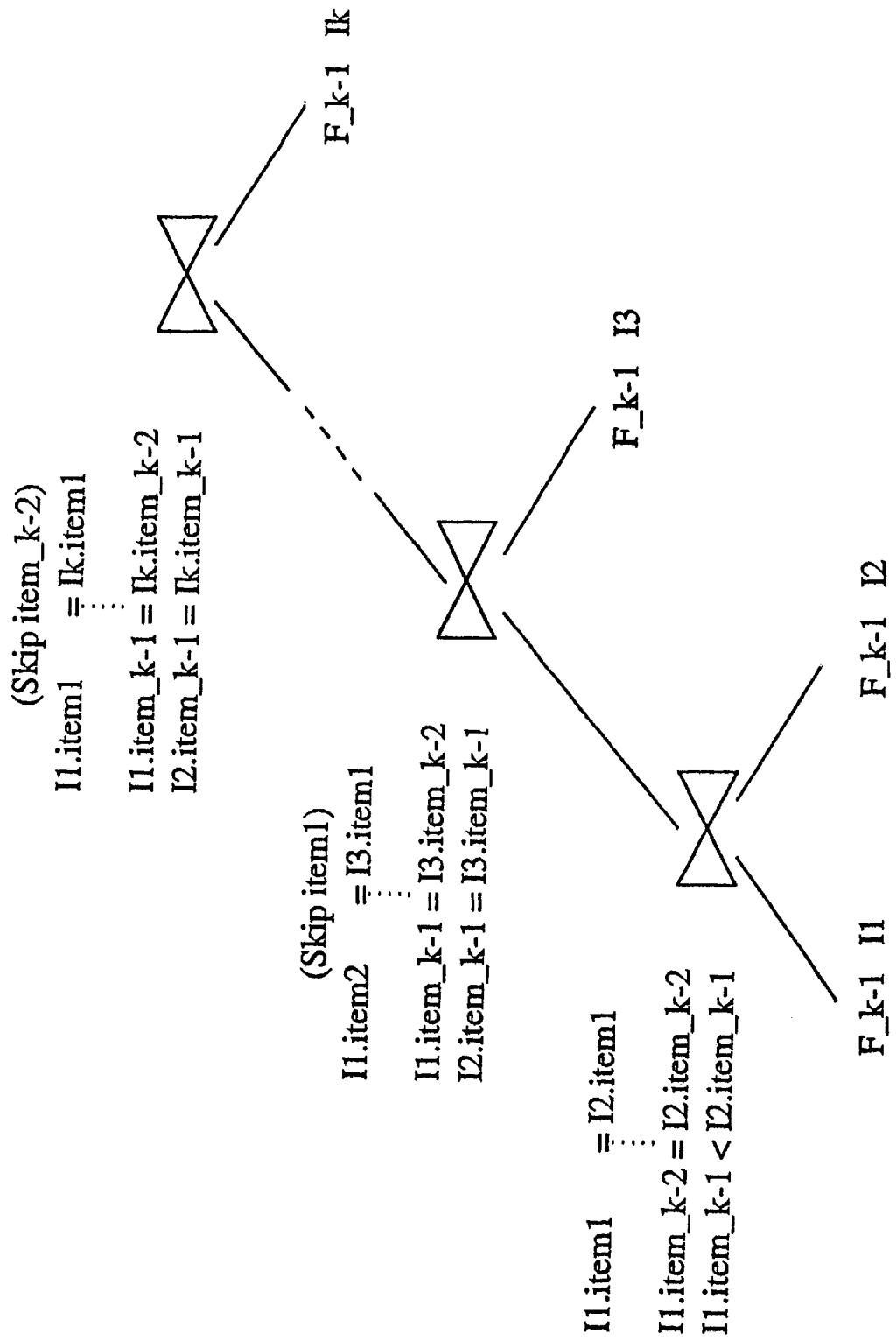
FIG. 4 illustrates the candidate generation using a k-way join, for any k.
Figure 5:
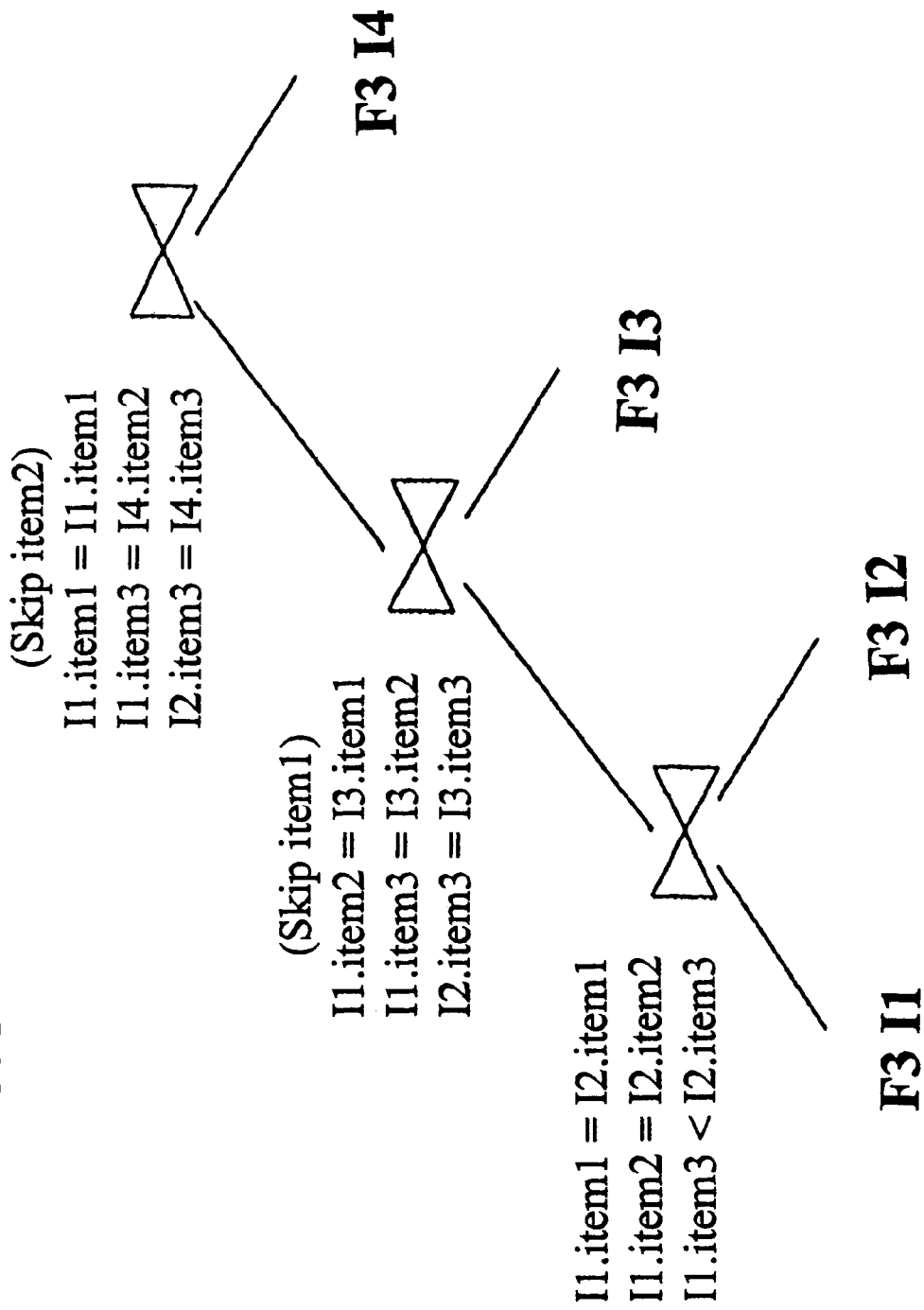
FIG. 5 illustrates the candidate generation using a k-way join, for k=4.

Next, in the prune step, all itemsets $c \in C_k$, where some $(k-1)$-subset of c is not in $F_{k-1}$, are deleted. Continuing with the example above, the prune step will delete the itemset $\{1\ 3\ 4\ 5\}$ because the subset $\{1\ 4\ 5\}$ is not in $F_3$. $C_4$ is then left with only $\{1\ 2\ 3\ 4\}$. The prune step can be done in the same SQL statement as the join step above by writing it as a k-way join as shown in FIG. 4. A k-way join is used since for any k-itemset there are k subsets of length $(k-1)$ for which we need to check in $F_{k-1}$ for membership. The join predicates on $I_1$ and $I_2$ remain the same. After the join between $I_1$ and $I_2$ we get a k itemset consisting of $(I_1.item_2, I_1.item_1, \ldots I_1.item_{k-1}, I_2.item_{k-1})$ as shown above. For this itemset, two of its $(k-1)$-length subsets are already known to be frequent since it was generated from two itemsets in $F_{k-}$. The remaining k–2 subsets are checked using additional joins. The predicates for these joins are enumerated by skipping one item at a time from the k-itemset as follows: $item_i$ is skipped and the subset $(I_1.item_2, \ldots, I_1.item_{k-1}, I_2.item_{k-1})$ is checked to see if it belongs to $F_{k-1}$ as shown by the join with 13 in the figure. In general, for a join with $I_r$ item $r-2$ is skipped. FIG. 5 shows an example of the candidate generation for k=4.

A primary index is constructed on $(item_1, \ldots, item_{k-1})$ of $F_{k-1}$ to efficiently process these k-way joins using index probes. Note that sometimes it may not be necessary to materialize $C_k$ before the counting phase. Instead, the candidate generation can be pipelined with the subsequent SQL queries used for support counting.

2. Counting support to find frequent itemsets

The candidate itemsets $C_k$ and data table T are used for counting the support of the itemsets in $C_k$. Two SQL categories may be used:

1. SQL-92: Four preferred embodiments based on SQL-92 will described below in section 4.

2. SQL object-relational extensions (SQL-OR): Five preferred embodiments based on SQL-OR extensions like user-defined functions (UDFs), binary large objects (BLOBs), and table functions, will be described below in section 5. Table functions are virtual tables associated with a user defined function which generate tuples on the fly. See, for example, "Extensions To Starburst: Objects, Types, Functions, and Rules," G. Lohman et al., Communications of the ACM, 34(10), October 1991. Like normal physical tables, they have pre-defined schemas. The function associated with a table function can be implemented as any other UDF. Thus, table functions can be viewed as UDFs that return a collection of tuples instead of scalar values.

3. Rule generation

In order to generate rules having minimum confidence (minconf), all non-empty proper subsets of every frequent itemset/are determined. For each subset m, a confidence of the rule m→(I–m) is derived. This rule is then output if it satisfies at least minconf.

In the support counting phase, the frequent itemsets of size k are stored in table $F_k$. Before the rule generation phase, all the frequent itemsets are merged into a single table F. The schema of F consists of k+2 attributes ($item_1, \ldots, item_k$, support, len), where k is the size of the largest frequent itemset and len is the length of the itemset.

Figure 6:
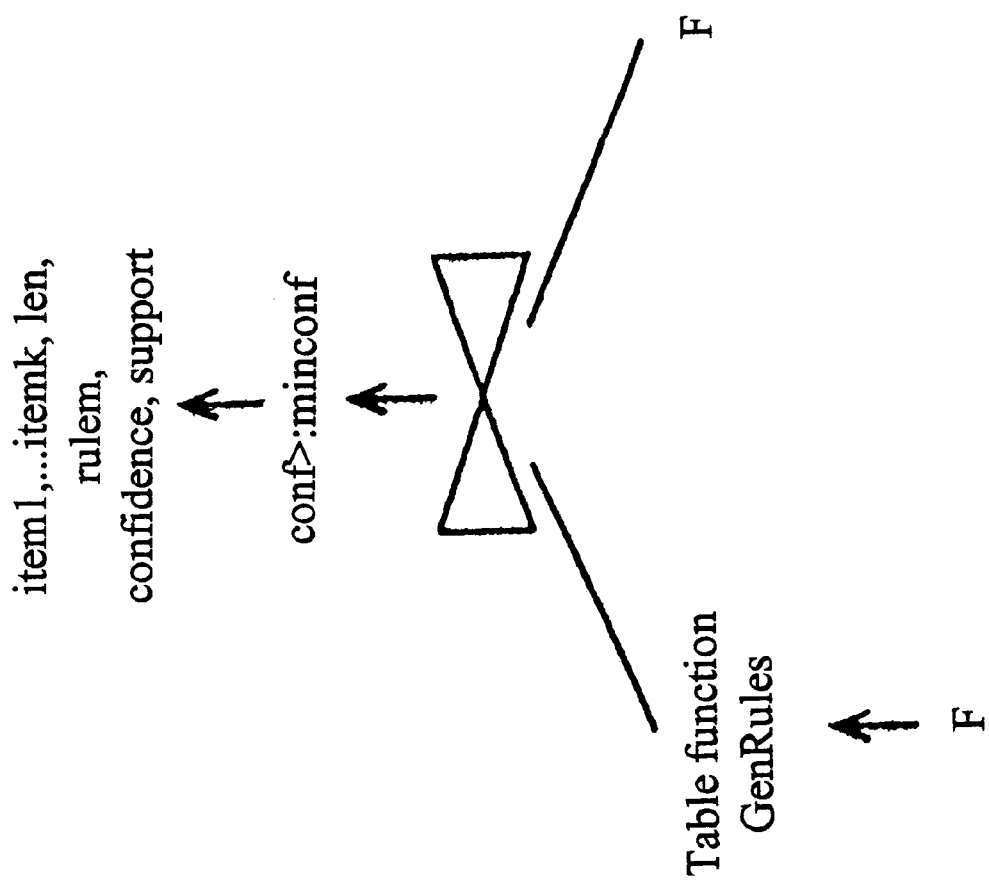
FIG. 6 illustrates the rule generation query in which a table function is used to generate all possible rules from a frequent itemset.

A table function, GenRules, is used to generate all possible rules from a frequent itemset. The input to the function is a frequent itemset. For each itemset, it outputs tuples corresponding to rules with all non-empty proper subsets of the itemset in the consequent. The table function outputs tuples with k+3 attributes, $T\_item_1, \ldots, T\_item_k$, $T\_support, T\_ten, T\_rulem$). The output is joined with F to find the support of the antecedent and the confidence of the rule is calculated by taking the ratio of the support values. FIG. 6 illustrates the rule generation query process, while the following pseudo-code shows a typical implementation of this step.

insert into R select $T\_item_1, \ldots, T\_item_k, t_1.support,$
      $T\_len, T\_rulem, t_1.support/f_2.support$
    from F $f_1$, table(GenRules($f_1.item_1, \ldots, f_1.item_k, f_1.len,$
      $f_1.support$)) as $t_1$, F $f_2$ where ($t_1.T\_item_1=f_2.item_1$ or
      $t_1.T\_rulem>1$)
    AND ($t_1.T\_item_k=f_2.item_k$ or $t_1.T\_rulem>k$)
    AND $t_1.T\_rulem=f_2.len$
    AND $t_1/T\_support/f_2.support>minconf$ The above rule generation can also be done using SQL-92 and without the table functions. The rules are generated in a level-wise manner in which rules are generated with consequents of size k in each level k. Further, for any frequent itemset, if a rule with consequent c holds then so do rules with consequents that are subsets of c. With this property, the rules in level k are formed using rules with (k–1) long consequents found in the previous level, as in the previously described candidate generation.

4. Support Counting Using SQL-92

There are four approaches to counting support with an SQL-92 engine.

a) K-way joins

Figure 7:
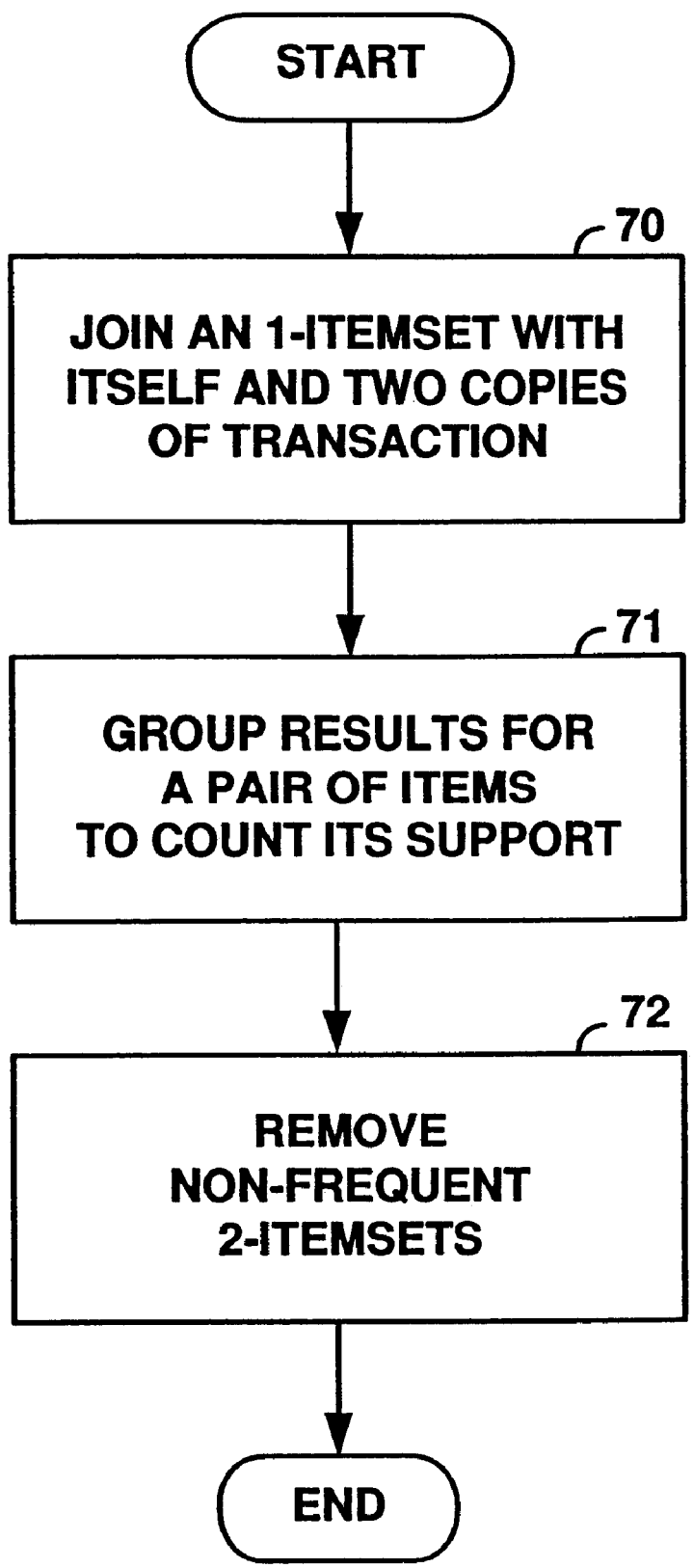
FIG. 7 is a flowchart showing further details of the process of determining frequent 2-itemsets (from step 31 of FIG. 3).
Figure 8:
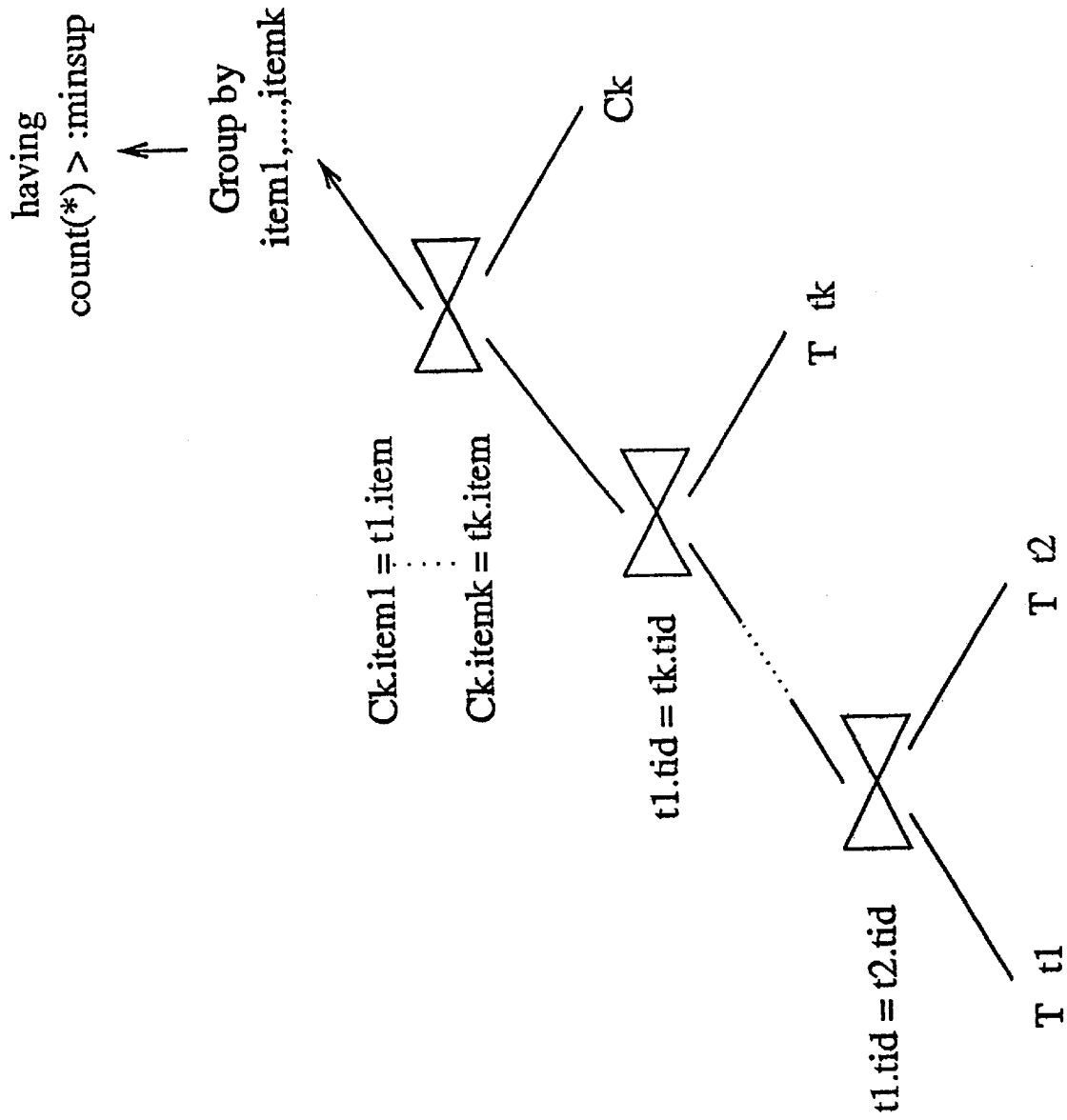
FIG. 8 illustrates a tree diagram of the query in a k-way join.

In each pass k, the candidate itemsets $C_k$ is joined with k transaction tables T. This is followed by a group-by operation on the itemsets as shown by the following pseudo-code.

insert into $F_k$ select $item_1, \ldots, item_k$, count(*)
    from $C_k, T_1, \ldots T\ t_k$
    where $t_1.item=C_k.item_1$ and
      $t_k.item=C_k.item_k$ and
      $t_1.tid=t_2.tid$ and
      $t_{k-1}.tid=t_k.tid$
    group by $item_1, item_2 \ldots item_k$
    having count(*)>minsup For the second pass, a special optimization is used where instead of materializing $C_2$, it is replaced with the 2-way joins between the two copies of $F_1$. This saves the cost of materializing $C_2$ and also provides early filtering of the T based on $F_1$ instead of the larger $C_2$. In contrast, for other passes corresponding to k>2, $C_k$ could be smaller than $F_{k-1}$ because of the prune step. FIG. 7 is a flowchart showing further details of the process of determining frequent 2-itemsets (from step 31 of FIG. 3), while FIG. 8 shows a tree diagram of the query. This tree diagram is not to be confused with the plan trees which could look quite different. This SQL computation, when merged with the candidate generation step, can be used as a possible mechanism to implement query flocks.

b) Three-way joins

Figure 9:
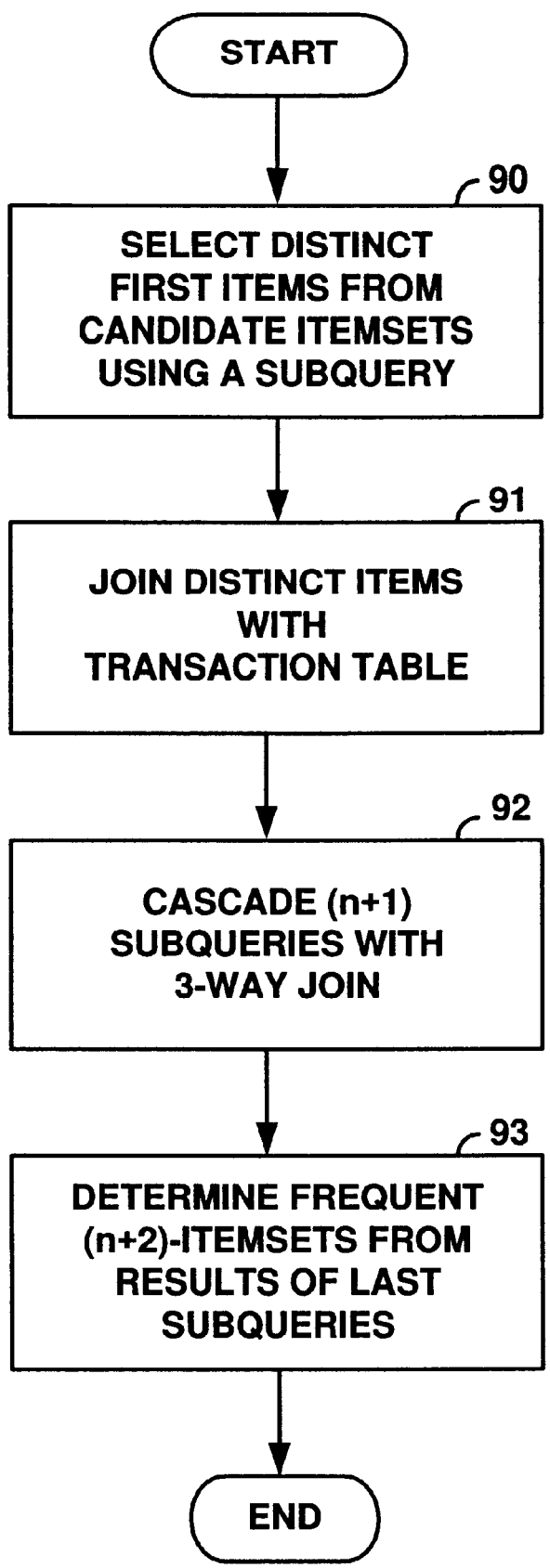
FIG. 9 is a flowchart showing further details for the step of determining frequent (n+2)-itemsets (step 33 of FIG. 3) using a subqueries-based approach.

The above approach requires (k+1)-way joins in the k-th pass. The cardinality of joins can be reduced to 3 using the following approach. Each candidate itemset $C_k$, in addition to attributes (item$_1$, . . . , item$_k$) has three new attributes (oid, id$_1$, id$_2$). oid is a unique identifier associated with each itemset, and id$_1$ and id$_2$ are oids of the two itemsets in $F_{k-1}$ from which the itemset in $C_k$ was generated. In addition, in the k-th pass a new copy of the data table $T_k$ with attributes (tid, oid) is generated that keeps for each tid the oid of each itemset in $C_k$ that it supported. For support counting, $T_k$ is first generated from $T_{k-1}$ and $C_k$. A group-by operation is performed on $T_k$ to find $F_k$ as follows:

insert into $T_k$ select $t_1$.tid, oid
    from $C_k$, $T_{k-1}$ $t_1$, $T_{k-1}$ $t_2$
    where $t_1$.oid=$C_k$.id$_1$ and $t_1$.oid=$C_k$.id$_2$ and $t_1$.tid=$t_2$.tid
    insert into $F_k$ select oid, item$_1$, . . . item$_k$, cnt
    from $C_k$,
      (select oid as cid, count(*) as cnt from $T_k$
      group by oid having count(*)>minsup) as temp
    where $C_k$.oid=cid c) Subquery-based This approach makes use of common prefixes between the itemsets in $C_k$ to reduce the amount of work done during support counting. The support counting phase is broken into a cascade of k subqueries. The l-th subquery $Q_l$ finds all tids that match the distinct itemsets formed by the first l columns of $C_k$ (call it dl). The output of $Q_l$ is joined with T and $d_{l+1}$ (the distinct itemsets formed by the first l+1 columns of $C_k$) to get $Q_{l+1}$. The final output is obtained by doing a group-by on the k items to count support as above. For k=2, the same query as in the k-join approach is used. FIG. 9 is a flowchart showing further details for the step of determining frequent (n+2)-itemsets, while the following pseudo-code represents a typical implementation of this step.

insert into $F_k$ select item$_1$, . . . item$_k$, count(*)
    from (Subquery $Q_k$) t
    group by item$_1$, item$_2$ . . . item$_k$
    having count(*)>:minsup
    Subquery $Q_l$ (for any l between 1 and k):
    select item$_1$ . . . item$_l$, tid
    from T $t_l$, (Subquery $Q_{l-1}$) as $r_{l-1}$,
      (select distinct item$_1$ . . . item$_l$ from $C_k$) as $d_l$
      where $r_{l-1}$.item$_1$=$d_l$.item$_1$ and . . . and
      $r_{l-1}$.item$_{l-1}$=$d_l$.item$_{l-1}$ and
      $r_{l-1}$.tid=$t_l$.tid and
      $t_l$.item=$d_l$.item$_l$
    Subquer $Q_0$: No subquery d) Two group-bys This approach avoids the multi-way joins used in the previous approaches, by joining T and k based on whether the "item" of a (tid, item) pair of T is equal to any of the k items of $C_k$. Then, do a group by on (item$_1$, . . . , item$_k$, tid) filtering tuples with count equal to k. This gives all (itemset, tid) pairs such that the tid supports the itemset. Finally, as in the previous approaches, do a group-by on the itemset (item$_1$, . . . , item$_k$) filtering tuples that meet the support condition.

insert into $F_k$ select item$_1$, . . . , item$_k$, count(*)
    from (select item$_1$, . . . , item$_k$, count(*)
      from T, $C_k$
      where item=$C_k$.item$_1$ or
        item=$C_k$.item$_k$
      group by item$_1$, . . . , item$_k$, tid
      having count(*)=k) as temp
    group by item$_1$, . . . , item$_k$
    having count(*)>minsup 5. Support Counting Using SQL With Object-Relational Extensions The performance of an integrated database and data-mining system may be further improved using additional object-relational extensions to SQL for counting the itemset support. Such a method, called GatherJoin, and its variants, GatherCount, GatherPrune, and Horizontal, are now described.

a) GatherJoin

Figure 10:
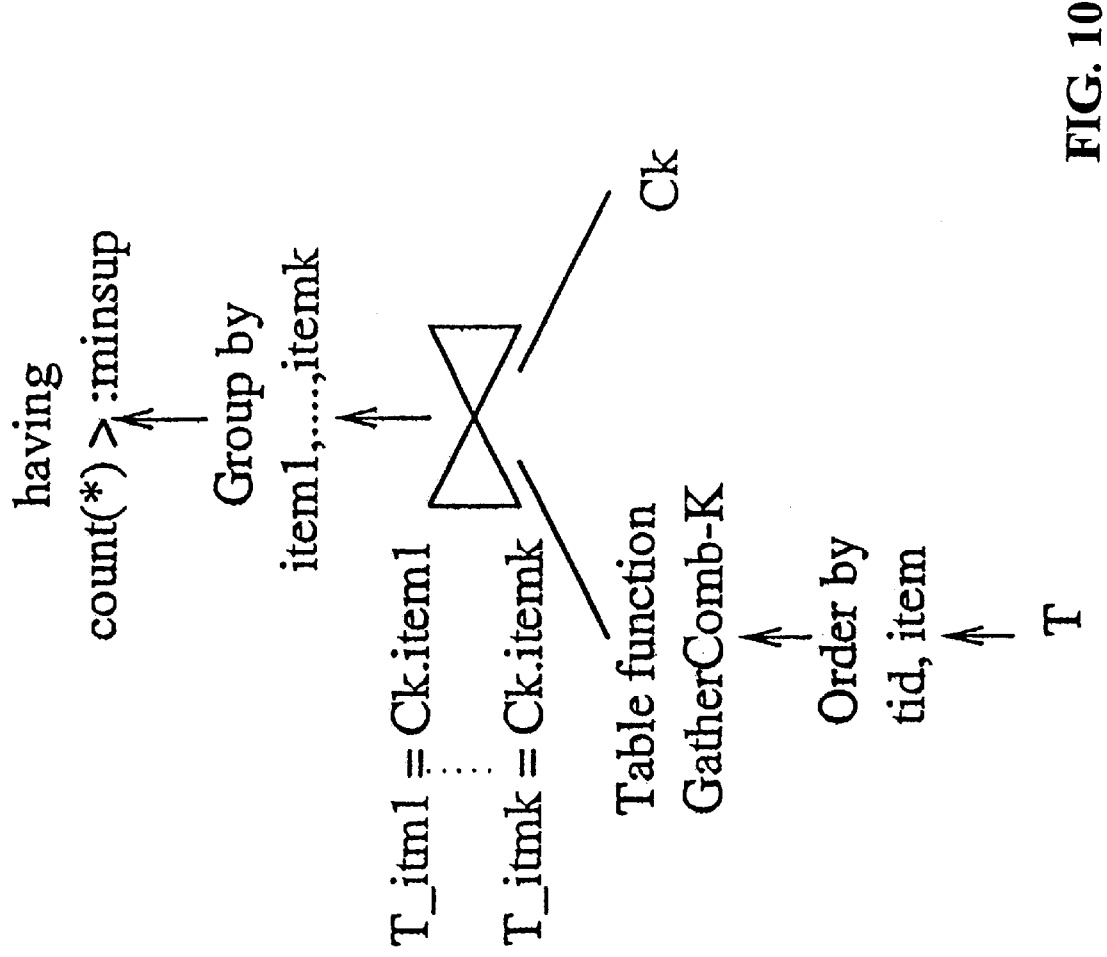
FIG. 10 illustrates the SQL queries for the GatherJoin method.

This approach is based on the use of table functions described above. It generates all possible k-item combinations of items contained in a transaction, joins them with the candidate table $C_k$, and counts the support of the itemsets by grouping the join result. Two table functions, Gather and Comb-K, are used. The data table T is scanned in the (tid, item) order and passed to the table function Gather. This table function collects all the items of a transaction (in other words, items of all tuples of T with the same tid) in memory and outputs a record for each transaction. Each such record consists of two attributes, the tid and item-list which is a collection of all its items in a VARCHAR or a BLOB. The output of Gather is passed to another table function Comb-K which returns all k-item combinations formed out of the items of a transaction. A record output by Comb-K has k attributes T_itm$_1$, . . . , T_itm$_k$, which can be directly used to probe into the $C_k$ table. An index is constructed on all the items of $C_k$ to make the probe efficient. FIG. 10 illustrates the SQL queries for the GatherJoin approach.

Figure 11:
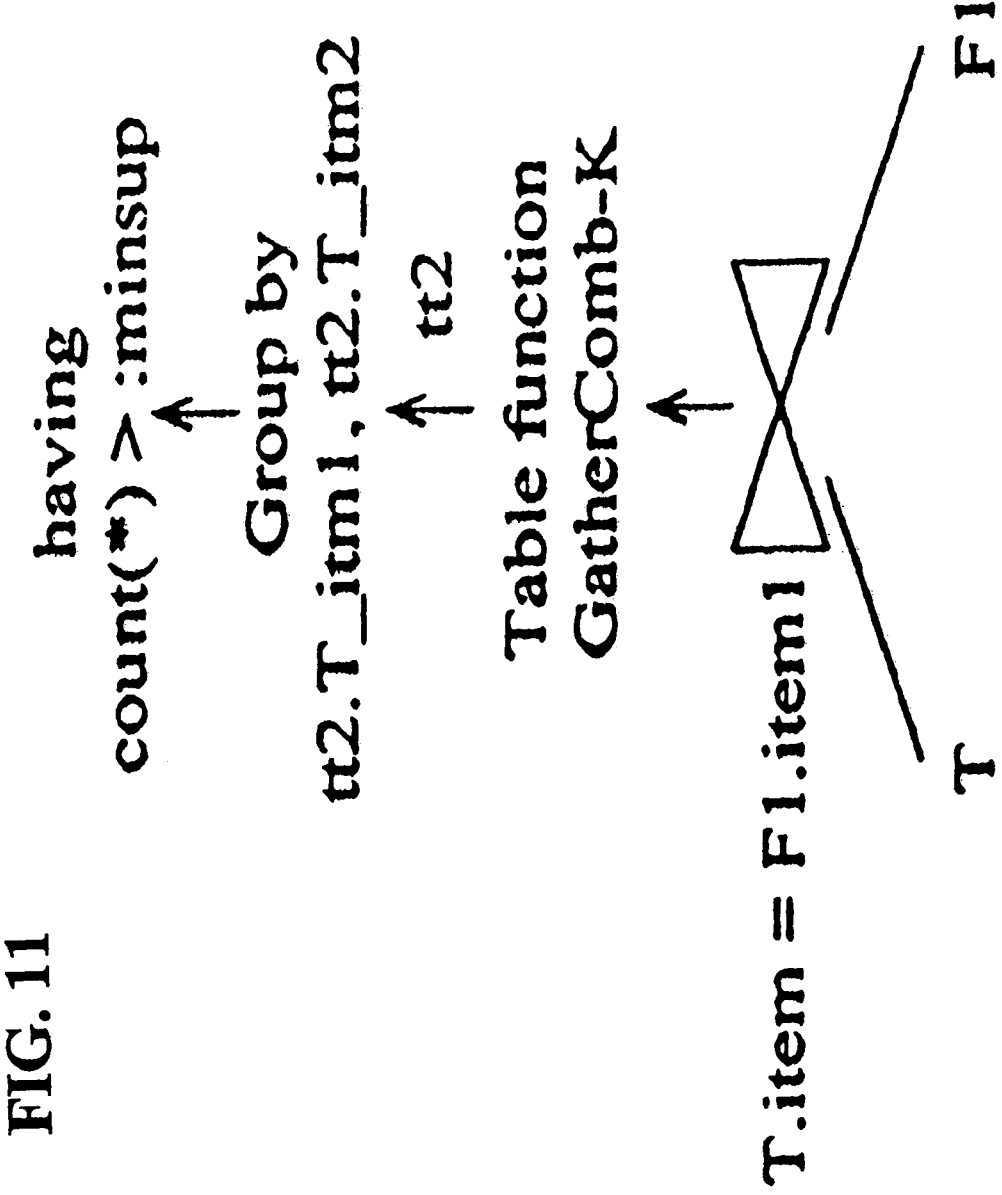
FIG. 11 illustrates the support counting using GatherJoin in the second pass on the data.

This approach is analogous to the K-way Join approach where the k-way self join of T is replaced with the table functions Gather and Comb-K. It is possible to merge these functions together as a single table function GatherComb-K. The Gather function is not required when the data is already in a horizontal format where each tid is followed by a collection of all its items. The pseudo-code below illustrate a typical implementation of GatherJoin approach for counting support.

insert into $F_k$ select item$_1$, . . . , item$_k$, count(*)
    from $C_k$,
      (select $t_2$.T_itm$_1$, . . . , $t_2$.T_itm$_k$ from T,
      table (Gather(T.tid, T.item)) as $t_1$,
      table (Comb-K($t_1$.tid, $t_1$.item-list)) as $t_2$)
    where $t_2$.T_itm$_1$=$C_k$.item$_1$ and
      $t_2$.T_itm$_k$=$C_k$.item$_k$
    group by $C_k$.item$_1$, . . . , $C_k$.item$_k$
    having count(*)>minsup Note that for k=2, the 2-candidate set $C_2$ is simply a join of $F_1$ with itself. Accordingly, the pass 2 can be optimized by replacing the join with $C_2$ by a join with $F_1$ before the table function (see FIG. 10). That way, the table function gets only frequent items and generates significantly fewer 2-item combinations. This optimization can be useful for other passes too, but unlike for pass 2, they still require a join with $C_k$. FIG. 11 illustrates the support counting using GatherJoin in the second pass on the data. The pseudo-code for a typical implementation of the second-pass optimization is as follows.

insert into $F_k$ select $t_1$.item, $t_2$.item, cnt
    from (select item$_1$, item$_2$, CountIntersect($t_1$.tid-list, $t_2$.tid-list) as cnt
      from TidTable $t_1$, TidTable $t_2$
      where $t_1$.item<$t_2$.item) as t
    where cnt>:minsup b) Variations of GatherJoin GatherCount: One variation of the GatherJoin approach for pass two is the GatherCount approach where the group-by is performed inside the table function instead of doing it outside. The candidate 2-itemsets ($C_2$) are represented as a two dimensional array inside the modified table function Gather-Cnt for doing the support counting. Instead of outputting the 2-item combinations of a transaction, it directly uses it to update support counts in the memory and output only the frequent 2-itemsets, $F_2$ and their support after the last transaction. Thus, the table function Gather-Cnt is an extension of the GatherComb-2 table function used in GatherJoin. The absence of the outer grouping makes this option an attractive solution. The UDF code is also small since it only needs to maintain a 2-dimension array. It can be applied for subsequent passes but for the added complexity of maintaining hash-tables to index the $C_k$s itemset. The disadvantage of this approach is that it can require a large amount of memory to store $C_2$. If enough memory is not available, $C_2$ needs to be partitioned and the process has to be repeated for each partition.

Gather Prune: A potential disadvantage of GatherJoin is the high cost of joining the large number of item combinations with $C_k$. The join with $C_k$ can be done in the table function to reduce the number of such combinations. $C_k$ is converted to a BLOB and passed as an argument to the table function. The cost of passing the BLOB for every tuple of R could be high. However, the parameter passing cost can be reduced by using a smaller BLOB that only approximates the real $C_k$. The trade-off is increased cost for other parts notably grouping because not as many combinations are filtered.

Horizontal: Another variation of GatherJoin is the Horizontal approach that first uses the Gather function to transform the data to the horizontal format but is otherwise similar to the GatherJoin approach.

The choice of the best SQL-OR approach depends on a number of data characteristics like the number of items, total number of transactions, average length of a transaction etc. The costs of different approaches in each pass can be determined in terms of parameters that are known or can be estimated after the candidate generation step of each pass, as defined in Table 1 below. The cost of GatherJoin includes the cost of generating k-item combinations, joining with $C_k$, and grouping to count the support. The number of k-item combinations generated is $C(N, k)*T$. The join with $C_k$ filters out the non-candidate item combinations. The size of the join result is the sum of the support of all the candidates denoted by

TABLE 1

Notation used for cost analysis of different approaches

| | |
|---|---|
| R | number of records in the input transaction table |
| T | number of transactions |
| N | average number of items per transaction $= \frac{R}{T}$ |
| $F_1$ | number of frequent items |
| S(C) | sum of support of each itemset in set C |
| $R_f$ | number of records out of R involving frequent items = $S(F_1)$ |
| $N_f$ | average number of frequent items per transaction $= \frac{R_f}{T}$ |

TABLE 1-continued

Notation used for cost analysis of different approaches

| | |
|---|---|
| $C_k$ | number of candidate k-itemsets |
| C (N, k) | number of combinations of size k possible out of a set of size n: $= \frac{n!}{k!(n-k)!}$ |
| $s_k$ | cost of generating a k item combination using table function Comb-k |
| group (n, m) | cost of grouping n records out of which m are distinct |
| join (n, m, r) | cost of joining two relations of size n and m to get a result of size r |
| blob (n) | cost of passing a BLOB of size n integers as an argument |

$S(C_k)$. The actual value of the support of a candidate itemset will be known only after the support counting phase. The total cost of the GatherJoin approach is found as:

$T_k*S_k+$join$(T_k, C_k,S(C_k))+$group$(S(C_k),C_k)$, where $T_k=C(N,k))*T$

This cost needs to be modified to reflect the special optimization of joining with F1 to consider only frequent items. For the second pass, the total cost of GatherJoin is:

$$\text{join}(R, F_1, R_f) + T_2 * s_2 + \text{group}(T_2, C_2),$$

$$\text{where } T_2 = C(N_f, 2) * T \approx \frac{N_f^2 * T}{2}$$

The cost of GatherCount in the second pass is similar to that for basic GatherJoin except for the final grouping cost:

join$(R,F_1,R_f)+$group_internal$(T_2,C_2)+F_2*S_2$, where "group_int" denotes the cost of doing the support counting inside the table function.

For GatherPrune, the cost is computed as:

$R*$blob$(k*C_k)+S(C_k)*sk+$group$(S(C_k), C_k)$.

where Blob$(k*C_k)$ denotes the BLOB passing cost since each itemset in $C_k$ contains k items.

The cost estimate of the Horizontal method is similar to that of GatherJoin except that here the data is materialized in the horizontal format before generating the item combinations.

c) Vertical

In this approach, the data table is first transformed into a vertical format by creating for each item a BLOB containing all tids that contain that item (Tid-list creation phase) and then count the support of itemsets by merging together these tid-lists (support counting phase).

A table function Gather is used for creating the Tid-lists. This is the same as the Gather function in GatherJoin except here, the tid-list is created for each frequent item. The data table T is scanned in the (item, tid) order and passed to the function Gather. The function collects the tids of all tuples of T with the same item in memory and outputs a (item, tid-list) tuple for items that meet the minimum support criterion. The tid-lists are represented as BLOBs and stored in a new TidTable with attributes (item, tid-list).

In the support counting phase, conceptually for each itemset in $C_k$ the tid-lists of all k items are collected and the number of tids in the intersection of these k lists is counted using a user defined function (UDF). The tids are in the same sorted order in all the tid-lists and therefore the intersection can be done easily and efficiently by a single pass of the k lists. This conceptual step can be improved further by decomposing the intersect operation so that we can share these operations across itemsets having common prefixes as follows:

First, distinct pairs of items ($item_1$, $item_2$) are selected from $C_k$. For each distinct pair, an intersect operation is performed to get a new result-tidlist. Distinct triples (item$_1$, item$_2$,item$_3$) are then determined from C$_k$ with the same first two items. The result-tidlist is intersected with tid-list for item3 for each triple, then with item$_4$ and so on until all k tid-lists per itemset are intersected.

Figure 12:
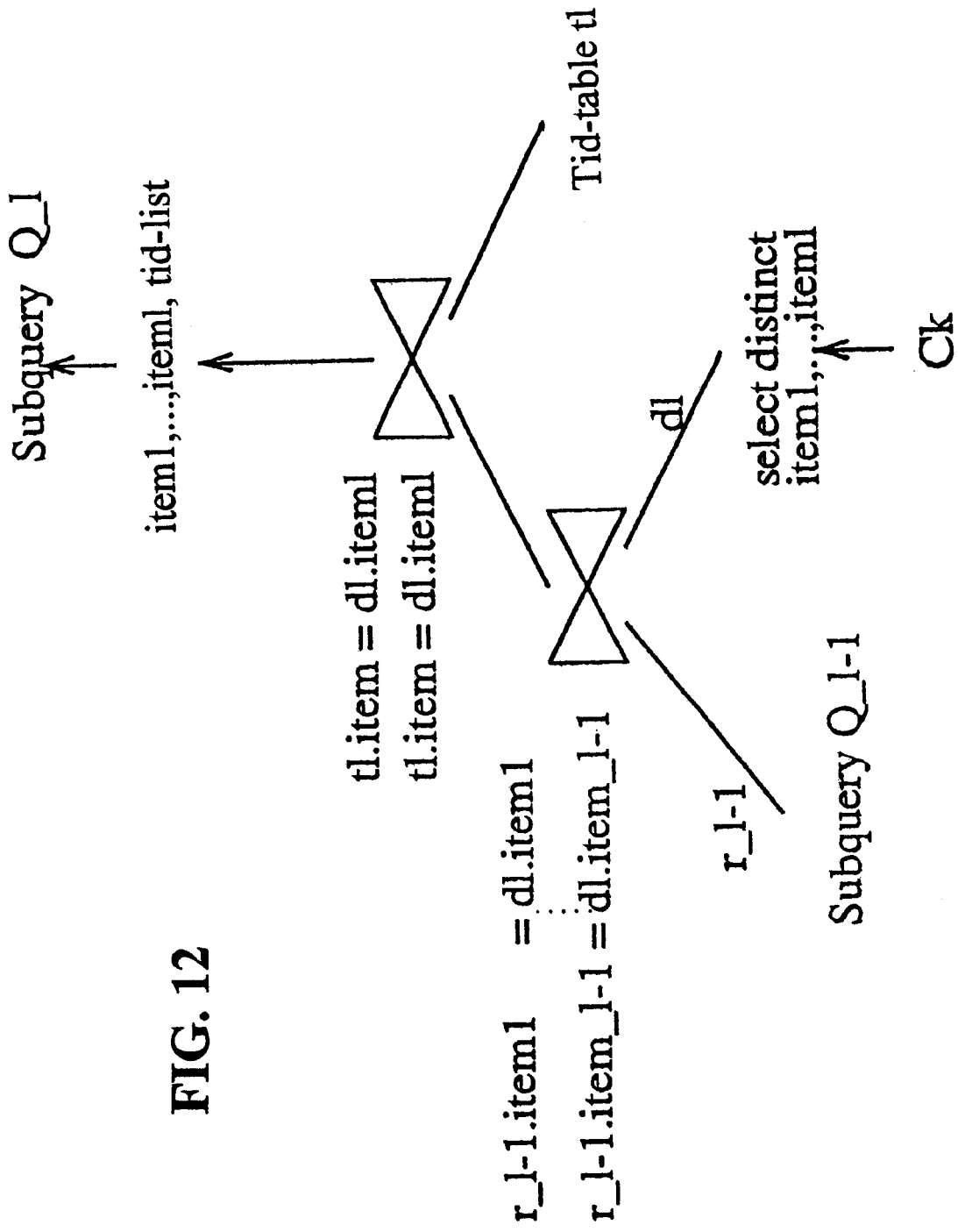
FIG. 12 illustrates a tree diagram for the vertical approach.

The above sequence of operations can be implemented as a single SQL query for any k, as shown in FIG. 12 and the following pseudo-code for Subquery Q$_1$ (select*from TidTable). The final intersect operation can be merged with the count operation to return a count instead of the tid-list. To simplify the illustration of the example, this optimization is omitted from the query in this pseudo-code.

insert into F$_k$ select item$_1$, . . . , item$_k$, count(tid-list) as cnt
    from (Subquery Q$_k$) t where cnt>:minsup
  Subquery Q$_l$ (for any l between 2 and k):
    select item$_1$, . . . , item$_l$,
      Intersect (r$_{l-1}$.tid-list, t$_1$.tid-list) as tid-list
    from TidTable t$_1$, (Subquery Q$_{l-1}$) as r$_{l-1}$,
      (select distinct item$_1$, . . . item$_l$ from C$_k$) as d$_l$
    where r$_{l-1}$.item$_1$=d$_l$.item$_1$ and . . . and
      r$_{l-1}$.item$_{l-1}$=d$_l$.item$_{l-1}$, and
      t$_1$.item=d$_l$.item$_l$ Special pass 2 optimization: For pass 2, it is not necessary to generate C$_2$ and join it with the TidTable. Instead, self-join is performed on the TidTable using predicate t$_1$.item<t$_2$.item, as shown in the following pseudo-code.

insert into F$_k$ select t$_1$.item, t$_2$.item, cnt
    from (select item$_1$, item$_2$, Count_Intersect(t1.tid-list, t2.tid-list) as cnt
      from TidTable t$_1$, TidTable t$_2$
      where t$_1$.item<t$_1$.item) as t
    where cnt>minsup The cost of the Vertical approach during support counting phase is dominated by the cost of invoking the UDFs and intersecting the tid-lists. The UDF is first called for each distinct item pair in C$_k$, then for each distinct item triple with the same first two items and so on. Let d$_j^k$ be the number of distinct j item tuples in C$_k$. Then the total number of times the UDF is invoked is $$\sum_{j=2}^{k} d_j^k.$$

In each invocation two BLOBs of tid-list are passed as arguments. The UDF intersects the tid-lists by a merge pass and hence the cost is proportional to 2*average length of a tid-list. The average length of a tid-list can be approximated to Rf_F1. Note that with each intersect the tid-list keeps shrinking. The total cost of the Vertical approach is:

$$\left(\sum_{j=2}^{k} d_j^k\right) * \left(2 * \text{Blob} * \left(\frac{R_f}{F_1}\right) + \text{Intersect}\left(\frac{2R_f}{F_1}\right)\right) \quad (1)$$

In formula (x), Intersect(n) denotes the cost of intersecting two tid-lists with a combined size of n. The join cost are not included in this analysis because it accounts for only a small fraction of the total cost.

The total cost of the second pass is:

$$C_2 * \left\{2 * \text{Blob} * \left(\frac{R_f}{F_1}\right) + \text{Intersect} * \left(\frac{2R_f}{F_1}\right)\right\} \quad (2)$$

Performance Evaluation

The performance results for mining boolean association rules using the above methods are now described. The results for mining generalized association rules and sequential patterns are similar. All of the experiments were performed on Version 5 of IBM DB2 Universal Server installed on a RS/6000 Model 140 with a 200 MHz CPU, 256 MB main memory and a 9 GB disc with a measured transfer rate of 8 MB/s. A collection of four real-life datasets were used. These datasets have differing values of parameters like the total number of (tid,item) pairs, the number of transactions (tids), the number of items and the average number of items per transaction. Table 2 summarizes these parameters.

A composite index (item$_1$, . . . , item$_k$) is built on C$_k$, k different indices on each of the k items of C$_k$ and a (tid, item) and a (item, tid) index on the data table. The index building cost is not reflected in the total time.

TABLE 2

Comparison of different SQL approaches

| Datasets | # Records in millions (R) | # Transactions in millions (T) | # Items in thousands (I) | Avg.# items per transaction (R/T) |
|---|---|---|---|---|
| Dataset-A | 2.5 | 0.57 | 85 | 4.4 |
| Dataset-B | 7.5 | 2.5 | 15.8 | 2.62 |
| Dataset-C | 6.6 | 0.21 | 15.8 | 31 |
| Dataset-D | 14 | 1.44 | 480 | 9.62 |

The Subquery method was found to be best SQL-92 approach, which was often more than an order of magnitude better than the other three approaches. However, this approach was comparable to the loose-coupling approach only in some cases whereas for several others it did not complete even after taking ten times more time than the loose-coupling approach.

FIGS. 13A–13D show the performance of the four SQL-OR approaches: GatherJoin method and its variants GatherPrune, GatherCount, and Vertical, on four datasets for different support values. Overall, the Vertical approach has the best performance and is sometimes more than an order of magnitude better than the other three approaches. The majority of the time of the Vertical approach is spent in transforming the data to the Vertical format in most. The vertical representation is like an index on the item attribute. Its performance is even better if this time is viewed as a one-time activity like index building.

The time taken is broken down by each pass and an initial "prep" stage where any one-time data transformation cost is included. Note that the time to transform the data to the Vertical format was much smaller than the time for the horizontal format although both formats write almost the same amount of data. The main reason was the difference in the number of records written. The number of frequent items is often two to three orders of magnitude smaller than the number of transactions.

Between GatherJoin and GatherPrune, neither strictly dominates the other. The special optimization in GatherJoin of pruning based on F1 had a big impact on performance. When these different approaches are compared based on the time spent in each pass, no single approach is "the best" for all different passes of the different datasets especially for the second pass. For pass three onwards, Vertical is often two or more orders of magnitude better than the other approaches. Two factors that affect the choice amongst the Vertical, GatherJoin and GatherCount approaches in different passes and pass 2 in particular are: number of frequent items (F1) and the average number of frequent items per transaction (Nf).

As a hybrid of the SQL-OR methods, the best of the GatherJoin, GatherCount, and Vertical approaches can be selected for each pass based on the cost estimation. The parameter values used for the estimation are all available at the end of the previous pass.

Impact of longer names: In this study, it is assumed that the tids and item ids are all integers. Often in practice these are character strings longer than four characters. The two (already expensive) steps that could suffer because of longer names are (1) final group-bys during pass 2 or higher when the GatherJoin approach is chosen and (2) tid-list operations when the Vertical approach is chosen. For efficient performance, the first step requires a mapping of item ids and the second one requires us to map tids. A table function is used to map the tids to unique integers efficiently in one pass and without making extra copies. The input to the table function is the data table in the tid order. The table function remembers the previous tid and the maintains a counter. Every time the tid changes, the counter is incremented. This counter value is the mapping assigned to each tid. The tid mapping is only needed to be done once before creating the TidTable in the Vertical approach. These two steps therefore can be pipelined. The item mapping is done slightly differently. After the first pass, a column is added to F1 containing a unique integer for each item, and similarly for the TidTable. The GatherJoin approach already joins the data table T with F1 before passing to table function Gather. Therefore, the integer mappings of each item can be passed to GatherJoin from F1 instead of its original character representation. After these two transformations, the tid and item fields are integers for all the remaining queries including candidate generation and rule generation. By mapping the fields this way, the longer names are expected to have similar performance impact on all of the described options.

Summary

Various preferred embodiments for an integrated mining and database system have been described, using association rule mining as an example. Some of the embodiments are implemented using SQL-92 while others are constructed using new object-relational extensions like UDFs, BLOBs, Table functions etc. The integrated systems built with the extended SQL provide orders of magnitude improvement over the SQL-92 based-implementations.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A method for mining rules from an integrated database and data-mining system having a table of data transactions and a query engine, the method comprising the steps of:
   a) performing a group-by query on the transaction table to generate a set of frequent 1-itemsets;
   b) determining frequent 2-itemsets from the frequent 1-itemsets and the transaction table;
   c) generating a candidate set of (n+2)-itemsets from the frequent (n+1)-itemsets, where n=1;
   d) determining frequent (n+2)-itemsets from the candidate set of (n+2)-itemsets and the transaction table using a query operation;
   e) repeating steps (c) and (d) with n=n+1 until the candidate set is empty; and
   f) generating rules from the union of the determined frequent itemsets.

2. The method as recited in claim 1, wherein:
   each transaction corresponds to a plurality of items; and
   the step of performing a group-by query includes the steps of counting the number of transactions that contain each item and selecting the items that have a support above a user-specified threshold in determining the frequent 1-itemsets, the support of an item being the number of transactions that contain the item.

3. The method as recited in claim 1, wherein the frequent 2-itemsets are generated using a join query.

4. The method as recited in claim 3, wherein the step of determining frequent 2-itemsets includes the steps of:
   joining an 1-itemset with itself and two copies of the transaction table using join predicates;
   grouping results of the joining step for a pair of items to count the support of the items in the pair; and
   removing all 2-itemsets having a support below a specified threshold.

5. The method as recited in claim 1, wherein the candidate (n+2)-itemsets are generated using an (n+2)-way join operation.

6. The method as recited in claim 1, wherein the frequent (n+2)-itemsets are determined using an (n+3)-way join query, on the candidate itemsets and (n+2) copies of the transaction table.

7. The method as recited in claim 1, wherein:
   the frequent (n+2)-itemsets are determined using cascaded subqueries; and
   the step of determining frequent (n+2)-itemsets includes the steps of:
       selecting distinct first items in the candidate itemsets using a subquery;
       joining the distinct first items with the transaction table;
       cascading (n+1) subqueries where each j-th subquery is a three-way join of the result of the last subquery, distinct j items from the candidate itemsets, and the transaction table; and
       determining which of the (n+2)-itemsets are frequent using the results of the last subqueries.

8. The method as recited in claim 1, wherein the step of generating rules includes the steps of:
   putting all items from the frequent itemsets into a table F;
   generating a set of candidate rules from the table F using a table function;
   joining the candidate rules with the table F; and
   filtering out from the candidate rules those that do not meet a confidence criteria.

9. The method as recited in claim 1, wherein:
   the query engine is an object-relational engine; and
   the steps of generating 2-itemsets and (n+1)-itemsets include the steps of:
       selecting from Vertical, GatherCount, and GatherJoin a method having the best cost for generating the (n+1)-itemsets;
       if the Vertical method is selected, then transforming the transaction table into a vertical format; and
       generating the frequent (n+1)-itemsets using the selected method.

10. The method as recited in claim 9 wherein the cost for generating the itemsets is based on statistics about the data transactions and the candidate itemsets.

11. The method as recited in claim 1, wherein the query engine is an SQL engine.

12. An integrated data-mining system comprising:
a database having a table of data transactions;
a query engine coupled to the database;
a query preprocessor for generating queries and input parameters for the query engine;
means for performing a group-by query on the transaction table to generate a set of frequent 1-itemsets;
means for determining frequent 2-itemsets from the frequent 1-itemsets and the transaction table;
means for generating a candidate set of (n+2)-itemsets from the frequent (n+1)-itemsets, where n=1;
means for determining frequent (n+2)-itemsets from the candidate set of (n+2)-itemsets and the transaction table using a query having cascaded subqueries;
means for repeatedly generating the candidate set of (n+2)-itemsets and determining frequent (n+2)-itemsets with n=n+1 until the candidate set is empty; and
means for generating rules from the union of the determined frequent itemsets.

13. A computer program product for mining rules from an integrated database and data-mining system having a table of data transactions and a query engine, the product comprising:
a) means, recorded on the recording medium, for directing the system to perform a group-by query on the transaction table to generate a set of frequent 1-itemsets;
b) means, recorded on the recording medium, for directing the system to determine frequent 2-itemsets from the frequent 1-itemsets and the transaction table;
c) means, recorded on the recording medium, for directing the system to generate a candidate set of (n+2)-itemsets from the frequent (n+1)-itemsets, where n=1;
d) means, recorded on the recording medium, for directing the system to determine frequent (n+2)-itemsets from the candidate set of (n+2)-itemsets and the transaction table using a query operation;
e) means, recorded on the recording medium, for directing the system to repeatedly generate the candidate set of (n+2)-itemsets and determine frequent (n+2)-itemsets with n=n+1 until the candidate set is empty; and
f) means, recorded on the recording medium, for directing the system to generate rules from the union of the determined frequent itemsets.

14. The data-mining system as recited in claim 12, wherein:
each transaction corresponds to a plurality of items; and
the means for performing a group-by query includes means for counting the number of transactions that contain each item and selecting the items that have a support above a user-specified threshold in determining the frequent 1-itemsets, the support of an item being the number of transactions that contain the item.

15. The data-mining system as recited in claim 12, wherein the frequent 2-itemsets are generated using a join query.

16. The data-mining system as recited in claim 15, wherein the means for determining frequent 2-itemsets includes:
means for joining an 1-itemset with itself and two copies of the transaction table using join predicates;
means for grouping results of the joining step for a pair of items to count the support of the items in the pair; and
means for removing all 2-itemsets having a support below a specified threshold.

17. The data-mining system as recited in claim 12, wherein the candidate (n+2)-itemsets are generated using an (n+2)-way join operation.

18. The data-mining system as recited in claim 12, wherein the frequent (n+2)-itemsets are determined using an (n+3)-way join query, on the candidate itemsets and (n+2) copies of the transaction table.

19. The data-mining system as recited in claim 12, wherein:
the frequent (n+2)-itemsets are determined using cascaded subqueries; and
the means for determining frequent (n+2)-itemsets includes:
means for selecting distinct first items in the candidate itemsets using a subquery;
means for joining the distinct first items with the transaction table;
means for cascading (n+1) subqueries where each j-th subquery is a three-way join of the result of the last subquery, distinct j items from the candidate itemsets, and the transaction table; and
means for determining which of the (n+2)-itemsets are frequent using the results of the last subqueries.

20. The data-mining system as recited in claim 12, wherein the means for generating rules includes:
means for putting all items from the frequent itemsets into a table F;
means for generating a set of candidate rules from the table F using a table function;
means for joining the candidate rules with the table F; and
means for filtering out from the candidate rules those that do not meet a confidence criteria.

21. The data-mining system as recited in claim 12, wherein:
the query engine is an object-relational engine; and
the means for generating 2-itemsets and (n+1)-itemsets include:
means for selecting from Vertical, GatherCount, and GatherJoin a method having the best cost for generating the (n+1)-itemsets;
if the Vertical method is selected, then means for transforming the transaction table into a vertical format; and
means for generating the frequent (n+1)-itemsets using the selected method.

22. The data-mining system as recited in claim 21, wherein the cost for generating the itemsets is based on statistics about the data transactions and the candidate itemsets.

23. The data-mining system as recited in claim 12, wherein the query engine is an SQL engine.

24. The product as recited in claim 13, wherein:
each transaction corresponds to a plurality of items; and
the means for directing to perform a group-by query includes means, recorded on the recording medium, for directing the system to count the number of transactions that contain each item and selecting the items that have a support above a user-specified threshold in determining the frequent 1-itemsets, the support of an item being the number of transactions that contain the item.

25. The product as recited in claim 13, wherein the frequent 2-itemsets are generated using a join query.

26. The product as recited in claim 25, wherein the means for directing to determine frequent 2-itemsets includes:

means, recorded on the recording medium, for directing the system to join an 1-itemset with itself and two copies of the transaction table using join predicates;

means, recorded on the recording medium, for directing the system to group results of the joining step for a pair of items to count the support of the items in the pair; and means, recorded on the recording medium, for directing the system to remove all 2-itemsets having a support below a specified threshold.

27. The product as recited in claim 13, wherein the candidate (n+2)-itemsets are generated using an (n+2)-way join operation.

28. The product as recited in claim 13, wherein the frequent (n+2)-itemsets are determined using an (n+3)-way join query, on the candidate itemsets and (n+2) copies of the transaction table.

29. The product as recited in claim 13, wherein:

the frequent (n+2)-itemsets are determined using cascaded subqueries; and the means for directing to determine frequent (n+2)-itemsets includes:

means, recorded on the recording medium, for directing the system to select distinct first items in the candidate itemsets using a subquery;

means, recorded on the recording medium, for directing the system to join the distinct first items with the transaction table;

means, recorded on the recording medium, for directing the system to cascade (n+1) subqueries where each j-th subquery is a three-way join of the result of the last subquery, distinct j items from the candidate itemsets, and the transaction table; and means, recorded on the recording medium, for directing the system to determine which of the (n+2)-itemsets are frequent using the results of the last subqueries.

30. The product as recited in claim 13, wherein the means for directing to generate rules includes:

means, recorded on the recording medium, for directing the system to put all items from the frequent itemsets into a table F;

means, recorded on the recording medium, for directing the system to generate a set of candidate rules from the table F using a table function;

means, recorded on the recording medium, for directing the system to join the candidate rules with the table F; and means, recorded on the recording medium, for directing the system to filter out from the candidate rules those that do not meet a confidence criteria.

31. The product as recited in claim 13, wherein:

the query engine is an object-relational engine; and the means for directing the system to generate 2-itemsets and (n+1)-itemsets include:

means, recorded on the recording medium, for directing the system to select from Vertical, GatherCount, and GatherJoin a method having the best cost for generating the (n+1)-itemsets;

if the Vertical method is selected, then means, recorded on the recording medium, for directing the system to transform the transaction table into a vertical format; and means, recorded on the recording medium, for directing the system to generate the frequent (n+1)-itemsets using the selected method.

32. The product as recited in claim 31, wherein the cost for generating the itemsets is based on statistics about the data transactions and the candidate itemsets.

33. The product as recited in claim 13, wherein the query engine is an SQL engine.

* * * * *